US011965303B2

(12) United States Patent
Miller et al.

(10) Patent No.: US 11,965,303 B2
(45) Date of Patent: Apr. 23, 2024

(54) GROUP ANCHOR SYSTEM, SUBSEA INSTALLATION SYSTEM, METHOD FOR USING AND INSTALLING SAME

(71) Applicant: TRITON SYSTEMS, INC., Chelmsford, MA (US)

(72) Inventors: Zachary Miller, Nashua, NH (US); William Feather, Merrimack, NH (US); Nathan Krohn, Pearland, TX (US); Tyson Lawrence, Highland Ranch, CO (US); Jihan Eljadidi, Cambridge, MD (US); Tyler Robertson, North Attleboro, MA (US); Raf Mandujano, Arlington, MD (US)

(73) Assignee: TRITON SYSTEMS, INC., Chelmsford, MA (US)

( * ) Notice: Subject to any disclaimer, the term of this patent is extended or adjusted under 35 U.S.C. 154(b) by 0 days.

(21) Appl. No.: 18/251,209

(22) PCT Filed: Jun. 10, 2022

(86) PCT No.: PCT/US2022/033111
§ 371 (c)(1),
(2) Date: Apr. 28, 2023

(87) PCT Pub. No.: WO2022/261503
PCT Pub. Date: Dec. 15, 2022

(65) Prior Publication Data
US 2023/0392343 A1    Dec. 7, 2023

Related U.S. Application Data

(60) Provisional application No. 63/209,142, filed on Jun. 10, 2021.

(51) Int. Cl.
E02D 27/50     (2006.01)
E02D 27/12     (2006.01)

(52) U.S. Cl.
CPC ............ *E02D 27/50* (2013.01); *E02D 27/12* (2013.01); *E02D 2600/30* (2013.01)

(58) Field of Classification Search
CPC ...... E02D 27/50; E02D 27/12; E02D 2600/30
See application file for complete search history.

(56) References Cited

U.S. PATENT DOCUMENTS 5,244,312 A  *  9/1993  Wybro .................. E21B 43/017
                                                405/195.1
6,665,990 B1    12/2003  Cody et al.
(Continued)

FOREIGN PATENT DOCUMENTS

| CA | 2872298 A1 | 6/2015 |
| CN | 101705920 A | 5/2010 |
| CN | 104294838 A | 1/2015 |
| CN | 110453716 A | 11/2019 |

(Continued)

OTHER PUBLICATIONS

International Search Report and Written Opinion for PCT Application No. PCT/US2022/033111, dated Nov. 3, 2022, 13 pages.
International Preliminary Report on Patentability for PCT/US2020/061834 dated Jun. 2, 2022, 7 Pages.
(Continued)

Primary Examiner — Kyle Armstrong
(74) Attorney, Agent, or Firm — DLA Piper LLP

(57) ABSTRACT

Disclosed herein are a group anchor system, subsea installation tool and method of install such group anchor systems. The group anchor system includes a template through which a plurality of vertical piles, such as helical piles, are passed, drilled into the seabed at one end and secured to the template at the other to provide a mooring anchor for an offshore asset. The installation tool is a modular tool designed to mate with the group anchor system. Each module including drive mechanism for engaging and driving a pile. The piles may be driven simultaneously, individually, or in groups as required for proper placement and leveling. Methods of using the installation tool are also disclosed.

22 Claims, 17 Drawing Sheets

(56) References Cited

U.S. PATENT DOCUMENTS

| | | | |
|---|---|---|---|
| 8,729,723 B2 | 5/2014 | Boureau et al. | |
| 8,845,236 B1 | 9/2014 | Dosdourian et al. | |
| 10,100,482 B2 * | 10/2018 | Larsen | E02D 27/16 |
| 2003/0190195 A1 * | 10/2003 | Cuthill | E02D 5/80 |
| | | | 405/253 |
| 2005/0229836 A1 | 10/2005 | Borgen | |
| 2010/0135729 A1 | 6/2010 | Finnigan | |
| 2010/0166503 A1 | 7/2010 | Will | |
| 2011/0074155 A1 | 3/2011 | Scholte-Wassink | |
| 2012/0213597 A1 | 8/2012 | Baumsteiger | |
| 2015/0275461 A1 | 10/2015 | Kwon et al. | |
| 2016/0348332 A1 | 12/2016 | Talbert et al. | |
| 2017/0174294 A1 | 6/2017 | Meltsov et al. | |
| 2019/0271131 A1 | 9/2019 | Perko et al. | |
| 2021/0048055 A1 | 2/2021 | Brown | |
| 2021/0155322 A1 | 5/2021 | Miller et al. | |

FOREIGN PATENT DOCUMENTS

| | | |
|---|---|---|
| KR | 100719300 B1 | 5/2007 |
| KR | 20150021226 A | 3/2015 |
| KR | 20220160411 A | 12/2022 |
| WO | 2007019609 A1 | 2/2007 |
| WO | 2013140421 A1 | 9/2013 |
| WO | 2013150276 A1 | 10/2013 |

OTHER PUBLICATIONS

International Search Report and Written Opinion for PCT/US2020/061834 dated Jun. 22, 2021, 8 Pages.

Extended European Search Report for Application No. 20900513.1, dated Nov. 24, 2023, 7 pages.

* cited by examiner

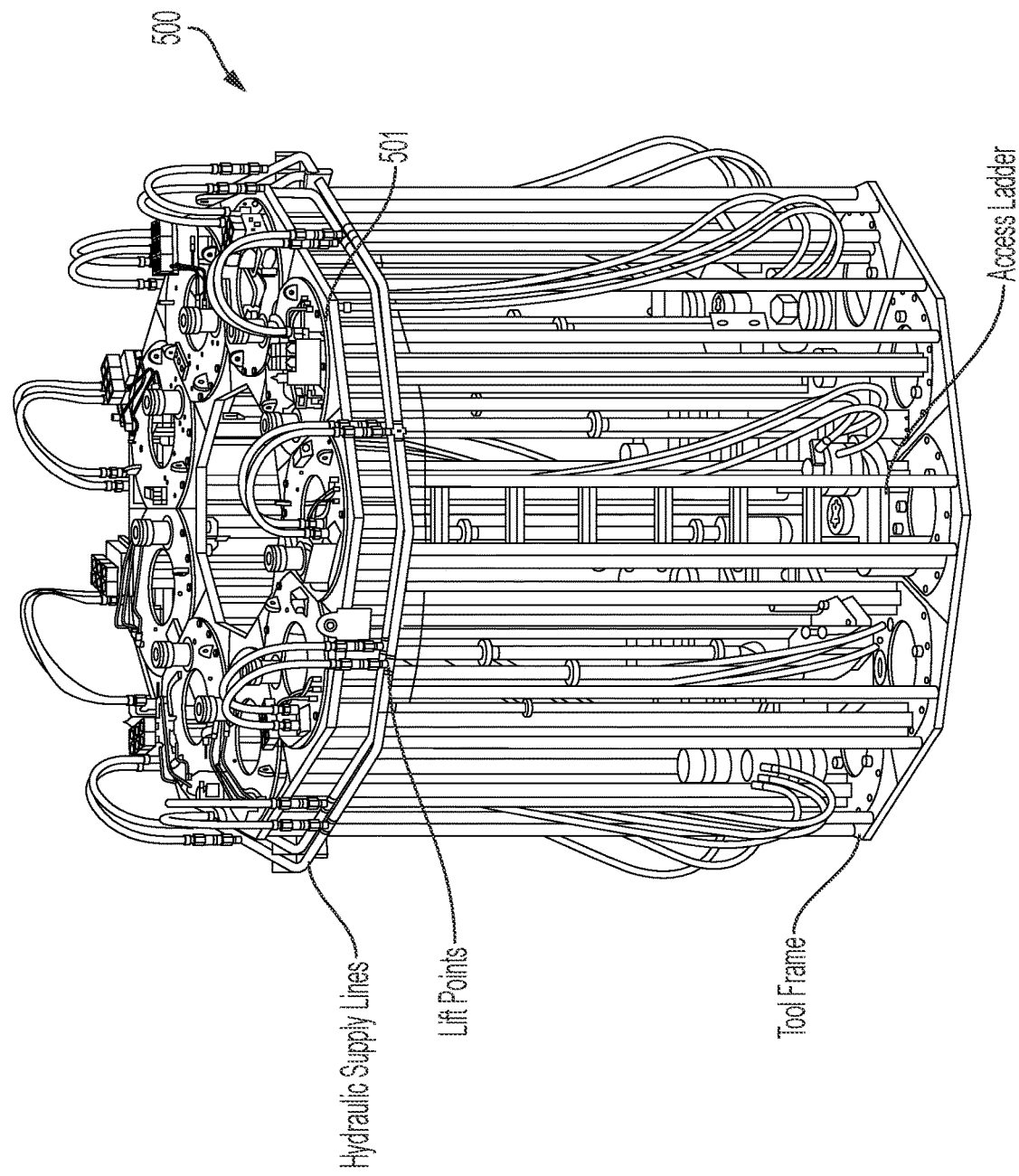

GROUP ANCHOR SYSTEM, SUBSEA INSTALLATION SYSTEM, METHOD FOR USING AND INSTALLING SAME

CROSS-REFERENCE TO RELATED APPLICATIONS

This application claims benefit of priority to U.S. Provisional Patent Application Ser. No. 63/209,142 entitled Helical Anchor Installation System, Subsea Installation Tool and Installation Method, which was filed on Jun. 10, 2021, which is hereby incorporated by reference in its entirety.

GOVERNMENT INTEREST

This invention was made with government support under U.S. Department of Energy Contract SC0017969 No. 2576. The government has certain rights to this invention.

FIELD

The present disclosure relates generally to a subsea group anchor system, systems and methods for the subsea installation of such subsea group anchor systems for securing floating and fixed offshore assets including but not limited to offshore energy, offshore renewable energy.

BACKGROUND

Capital expenditure is the greatest cost driver for installation of offshore anchors. These include installation of subsea helical piles for wind energy. Thus, this offers the greatest potential to reduce the levelized cost of energy (LCOE) and make wind energy competitive with other sources of energy. In general, mooring hardware comprises 10% of capital expenditure, and 16% in tension leg platforms. Total capital expenditure for a wind farm project can be billions of dollars. Mooring cost, therefore, presents a significant opportunity for cost savings. This is especially true on the West coast of the United States, where water depths are much deeper and floating turbines (and other offshore assets) are needed. In the offshore floating wind sector, traditional anchoring systems use large heavy weights, caissons, driven piles, or drag embedment anchors to achieve the high-pullout forces required for wind turbine moorings. The high weights and high forces necessary ultimately convert into high costs. These mooring and anchoring options are mature, but not necessarily realistic for large wind farms. This will lead to higher than expected costs.

The ability to install low cost group anchors subsea will provide an effective anchoring system for the offshore energy sector and other offshore uses. The present disclosure describes the low-cost, remote subsea anchor system as well as apparatus and methods for installation of such anchor systems.

SUMMARY

This summary is provided to comply with 37 C.F.R. § 1.73, requiring a summary of the invention briefly indicating the nature and substance of the invention. It is submitted with the understanding that it will not be used to interpret or limit the scope or meaning of the present disclosure.

Some embodiments provide an installation tool for installing a group anchor system, wherein the group anchor system comprises at least two piles, the installation tool comprising a plurality of installation modules, wherein each installation module comprises a linear guide rail connecting a top plate to an opposed bottom plate; a driver platform engaging the linear guide rail for movement thereon; wherein the drive platform includes a drive motor for engaging and driving a pile; a crowd device for applying vertical force to drive or remove a pile. The linear guide rail may be any suitable device such as a linear rod, pole, bar, or the like. In some embodiments a roller-based drive system, as described below can act as the linear guide rail. The crowd device may be a motor, linear actuator, or similar device applying vertical force.

In some embodiments, the at least two piles are helical piles, and the drive motor provides rotational force to drive a helical pile.

Some embodiments further comprise a multi-section installation tube which surrounds a shaft of a helical pile, wherein adjacent sections of the multi-section installation tube are connected with the drive head of the drive motor, such that the installation tool may be driven from any location, rather than, or in addition to, from the end. In some instances, the installation is accomplished via mated lugs in the drive head and along the length of the installation tube. As depicted in the inset of FIG. 1, a lower portion of the installation tool is provided with a way to mate with the lead section of the pile, so that as the installation tube is driven, it engages and drives the pile. Here, a toothed arrangement is shown which is useful for driving helical piles. The installation tube provides rigidity to a flexible shaft during driving activities. Notably, in addition to the intermediate connection lugs, and the lead section driver, there may be an additional securing lug (e.g. the exploded portion of the inset in FIG. 1). Once a flexible pile is installed, the installation tube is removed, and the securing lug is brought up, along the flexible shaft, and used to secure the flexible shaft to the template. In an exemplary arrangement, the securing lug can travel up the flexible shaft, pass through a collet, and then be rotate so its lugs engage the collet or other surface thereby securing the pile.

Some embodiments further comprise a rigid shaft, which may be provided with a plurality of drive lugs along its length for mating with the drive head of the drive motor, such that the installation tool may be driven from any drive lug location, rather than from the end.

In some embodiments, the plurality of installation modules may includes any number of modules, up to the number of piles. arranged in a predetermined pattern with respect to each other and each corresponding to a location of a pile to be driven. Some embodiments comprise 2-100 modules.

Some embodiments further comprise a control system permitting manual, remote, semi-automatic, or automatic driving of each module independently or simultaneously.

Some embodiments, further provide a plurality of installation tubes, one for each module; wherein each installation tube comprises two or more installation tube sections connected by a connector with a connector lug, such that the connector lug can engage with a drive lug such that the installation tube can be driven along its length at each connector lug.

Some embodiments provide a system for installation of one or more piles, wherein the system drives piles into the seabed at intermediate sections rather than from the top of the pile, wherein installation of the piles occurs subsea at deep ocean depth with subsea tooling. Other embodiments are used at shallow depths.

Some embodiments provide a method of installing a group anchor system comprising two or more piles, comprising: providing a multi-module installation tool wherein each module comprises a drive head for engaging drive lug for driving a pile into the seabed at intermediate sections rather than from the top of the pile; wherein installation of the piles occurs subsea at deep ocean depth with subsea tooling. Other embodiments are used at shallow depths.

In some embodiments, the one or more piles are helical piles.

In some embodiments, each module comprises: torque heads driven by motors (such as hydraulic or electric motors, linear actuators (piston, bar linkage, etc), motors attached drive to acme rods (or other linear rod) providing downward force, and various monitoring sensors such as torque, force, speed, position.

Some embodiments comprise an automated installation process.

Some embodiments comprise a user-controlled installation process.

In some embodiments, each module may be operated simultaneously or independently, or in group to facilitate leveling of the group anchor system.

Some embodiments provide a group anchor system comprising a plurality of vertical piles; a template, wherein the template defines an aperture for each of the plurality of vertical piles allowing the vertical pile to pass there through and to be secured therein; and one or more mooring connections.

Some embodiments comprise a skirt fixed to the perimeter of the template and extending therefrom towards and into the seabed.

In some embodiments, the skirt extends either perpendicularly, or at an outward angle from the template.

In some embodiments, one or more of the plurality of vertical piles further comprises an inner skirt, associated therewith. These inner skirts may be attached rigidly or flexible to the template and primary skirt.

In some embodiments, each vertical pile is a helical pile.

Some embodiments will be connected to the group anchor on a surface vessel.

Both the embodiment and group anchor would be lowered to the seafloor together by the vessel LARS (Launch and recovery system), crane, or A-lowering frame or by a unique anchor and tool system LARS, including crane on vessel or separate specific LARS.

Some embodiments will perform self-leveling if needed.

Some embodiments will initially install a subset of piles to a short embedment depth. For example, 1-10 piles could be partially installed to "seat" the anchor system before it is fully secured.

Some embodiments will activate other units until all helical piles are initially installed.

During initial installation, the skirt will self-install or with additional methods provided by the installation tool into the ground by the system weight and helical pile pull in force.

Some embodiments will continue to install all helical piles to the required embedment depth by installing sections of the helical pile's length. This process of installing shorter sections will continue until the full required length is completed.

Once all the helical piles reach the required embedment depth, the tool could remove the drive shaft, then lock the helical piles into the anchor template.

After the skirt is fully installed and all helical piles are locked into the template some embodiments will release the installation tool and return back to the surface vessel.

Some embodiments provide an offshore anchor system comprising two or more helical anchors, each having a predetermined length; and a template acting as a base to locate the helical anchors at a prescribed distance for installation.

BRIEF DESCRIPTION OF THE DRAWINGS

The accompanying drawings, which are incorporated in and form a part of the specification, illustrate the embodiments of the invention and together with the written description serve to explain the principles, characteristics, and features of some embodiments of the invention. In the drawings:

FIGS. 1-8 show an exemplary helical pile system and the installation equipment and methodology of the installation tool. The self-leveling feet are removed for picture clarity.

FIG. 1 is a perspective view of a group anchor system and installation tool in accordance with some embodiments, including an insert showing an exemplary drive lug.

FIG. 2 is a partial cut-away view of a group anchor system in accordance with some inventions.

FIG. 3 depicts an exemplary collar receiver weldment for securing a pile to a template.

FIG. 4 is an alternative view of a group anchor system in accordance with some embodiments, particularly show multiple mooring connections.

FIG. 5 depicts a flexible pile, particularly a helical pile having a flexible shaft.

FIG. 6 depicts an embodiment of the group anchor system employing multiple skirts.

FIG. 7 shows an exemplary installation tool including a plurality of installation modules.

FIG. 8 depicts an exemplary installation module.

DETAILED DESCRIPTION

Figure 1:
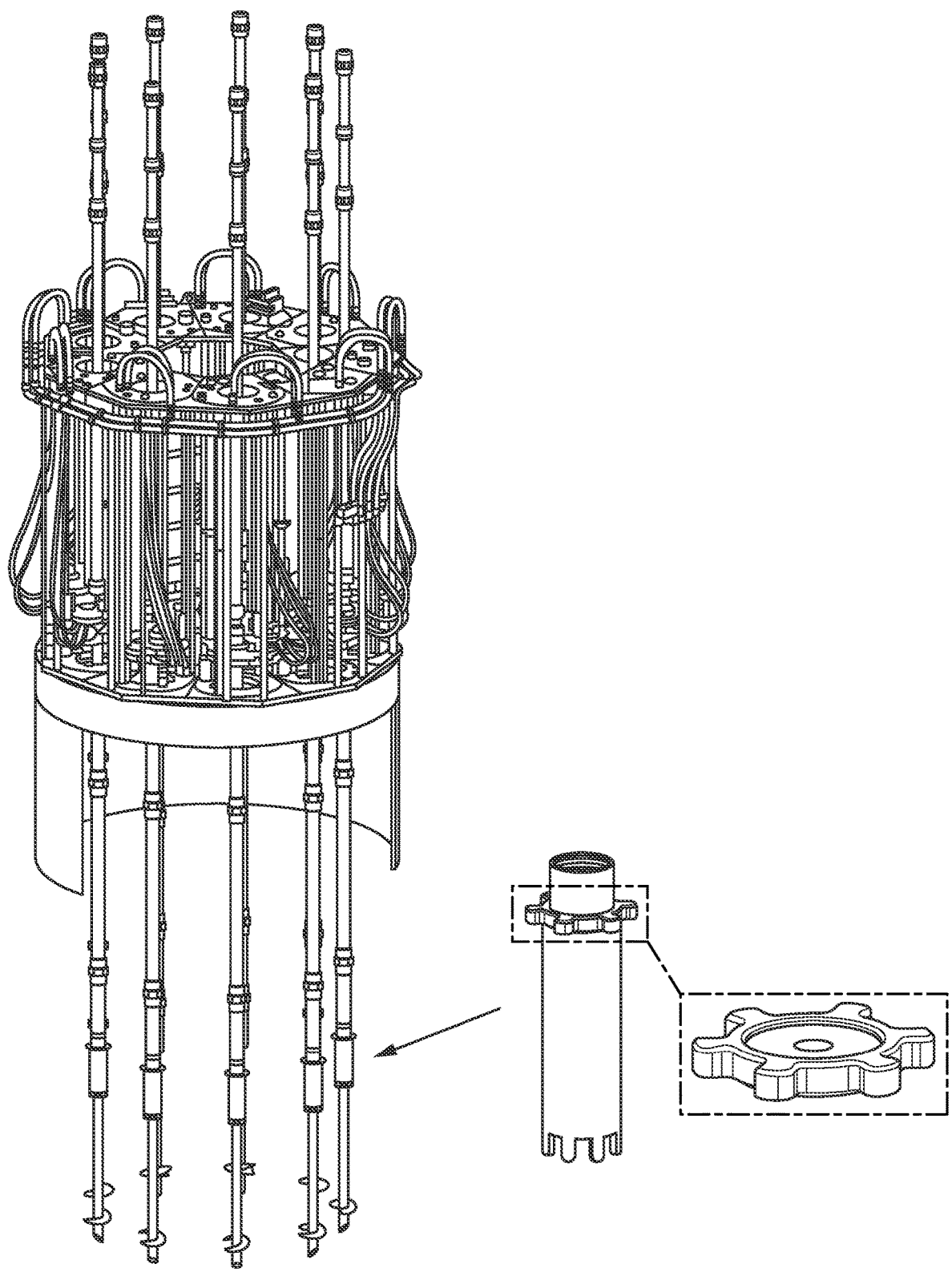

This disclosure is not limited to the particular apparatus, systems, devices and methods described, as these may vary. The terminology used in the description is for the purpose of describing the particular versions or embodiments only, and is not intended to limit the scope.

The present disclosure describes a group anchoring system, designed for offshore assets, keeping in mind economic drivers such as manufacturing, transport, installation, and the benefits of mass production. The group anchor system and installation tool are useful for an offshore asset, such as wind farms, other floating renewable energy, aquaculture enclosures, manned submersibles, unmanned submersibles, buoys, monitoring buoys, turbine, fixed turbine, subsea cable, non-floating subsea infrastructure, or any other offshore asset. Some embodiments are based on highly efficient helical piles that will reduce LCOE. It consists of an anchor and installation tool that solves the traditional challenges with installing these anchors subsea. Although it will be appreciated that the installation tool may be re-used with additional group anchor systems such that the same tool may be used to install multiple group anchor systems over time. Lower manufacturing costs of the group anchor system, faster installation times, lower noise for the subsea tool over a driven pile hammer are just a few of the benefits.

In the following description, for purposes of explanation, numerous specific details are set forth in order to provide a thorough understanding of example embodiments. It will be evident to one skilled in the art, however, that embodiments can be practiced without these specific details. For example, this disclosure focuses on the use of helical piles in the group anchor system, but other anchor or pile systems may be used. For clarity, the terms "helical anchor" and "helical pile" are synonymous. For the purposes of this disclosure, we have chosen to use the term "helical pile" to designate a specific pile and "anchor" or "anchor system" to designate the entire group anchor system. The helical pile system is chosen herein for discussion because it is well-suited for the applications described herein, and has the benefits of providing additional horizontal holding capacity to the skirt due to minimized skirt rotation, can provide greater capacity than single helical piles, and installation of the helical piles is virtually silent and is biologically friendly.

While various illustrative embodiments incorporating the principles of the present teachings have been disclosed, the present teachings are not limited to the disclosed embodiments. Instead, this application is intended to cover any variations, uses, or adaptations of the present teachings and use its general principles without deviating from the scope and spirit of this disclosure. Further, this application is intended to cover such departures from the present disclosure that are within known or customary practice in the art to which these teachings pertain.

In the detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

Prior approaches to subsea installation of helical piles at deep ocean depth involve installation from the surface with vessel mounted equipment, and such approaches are not suitable for deep ocean depths. Prior approaches do not install multiple helical piles at deep ocean depth with subsea tooling. The present disclosure provides a method to apply both torque and downward force to install helical piles at deep ocean depth. Some embodiments are used at shallow depths or on land.

The group anchor system and installation tool described herein are well-suited and easily adapted for use in all depths, including shallow depth installations and deep depth installations. As used herein, "shallow depth" means under 50 feet, and "deep depth" means over 50 feet.

There are two main ways for installation of helical piles offshore: (1) use land based helical pile construction machinery aboard a vessel or jack-up rig, or (2) use custom offshore equipment aboard a vessel or jack-up rig.

Neither of these options provides a subsea installation tool to install multiple helical piles. The solution disclosed herein allows for the simultaneous installation of two or more piles in a group anchor system. Existing solutions, require serial installation of multiple piles when present. In some embodiments, all piles of the group anchor system may be driven at the same time. The present disclosure provides a cost-effective solution to install helical piles subsea at low cost with the use of standard offshore vessel spreads.

The Group Anchor System

In some embodiments, the group anchor system is one such as described in U.S. patent application Ser. No. 17/101,978 entitled Helical Anchor Group Installation System filed on Nov. 23, 2020, which is hereby incorporated by reference in its entirety. Such group anchor systems use multiple small helical piles, a template, and an optional skirt to provide the uplift and lateral capacities required to moor a floating wind platform.

Based on the concept of modularity, the group anchor system is designed for efficient manufacturing and transportation. Each component of the anchor, including the skirt, template, helical pile, lead section, collars, mooring connection base, are manufactured separately as individual components. The innovative modular connection methodology allows each component to be interchanged with another without having to redesign the entire structure.

Figure 2:
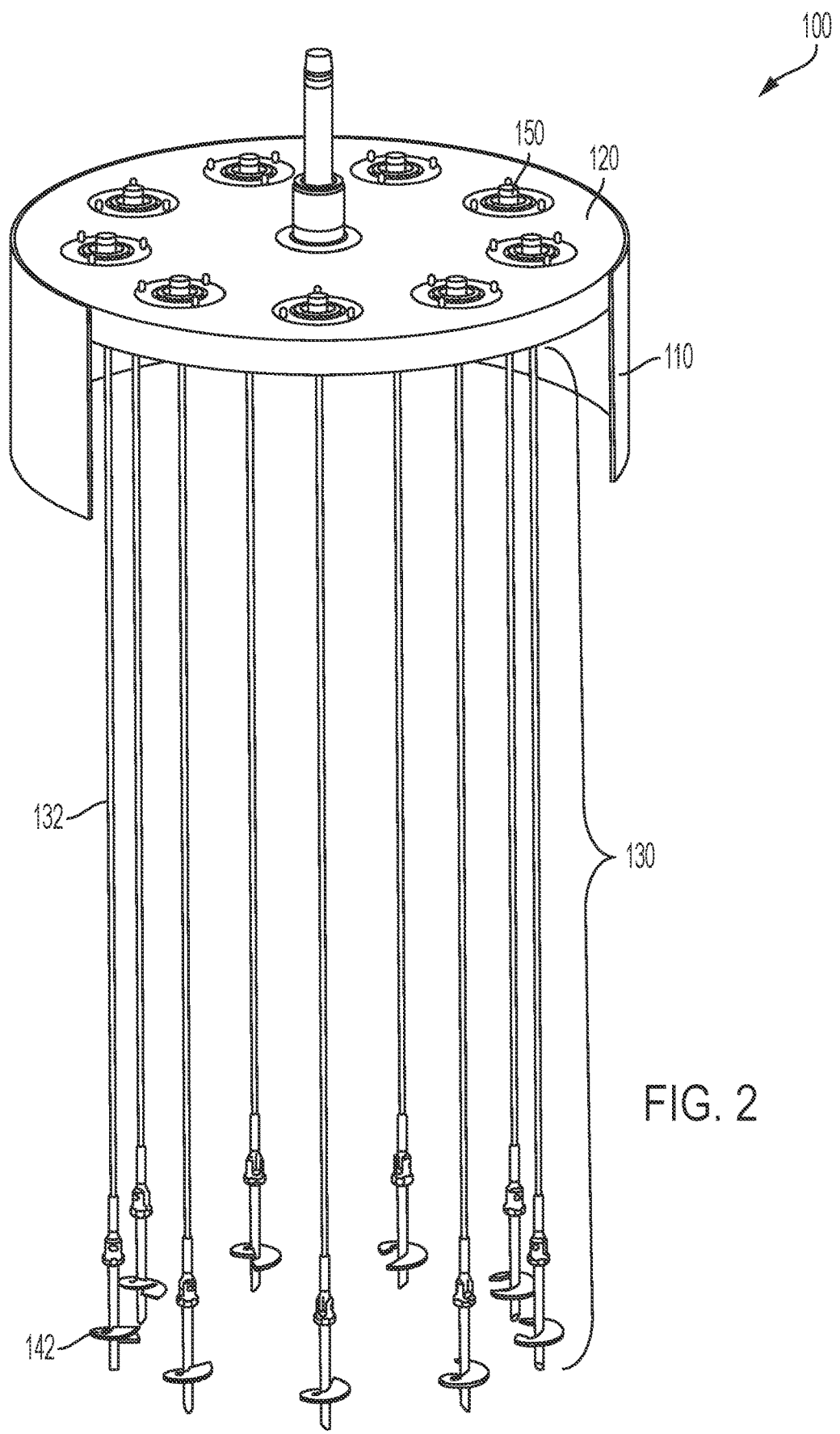
Figure 4:
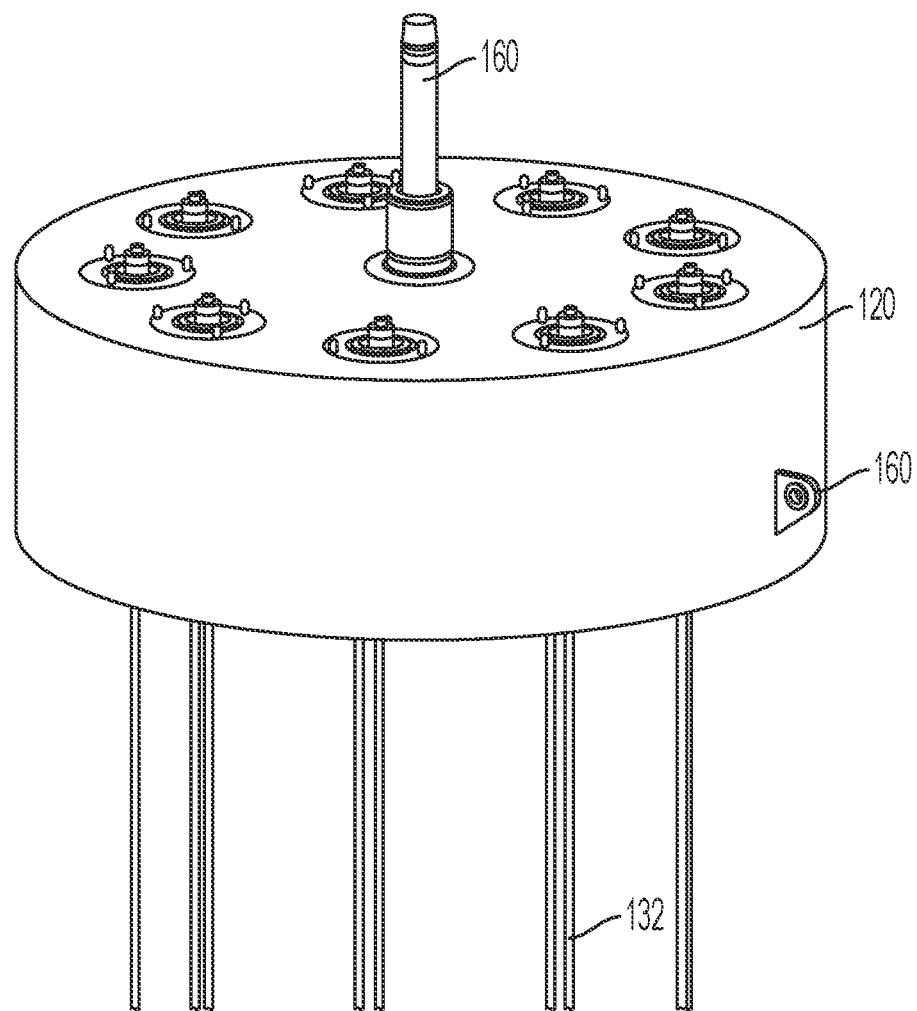

An improved group anchoring system, as disclosed herein and shown generically in FIGS. 2 and 4, comprised of modular components that when assembled, provides more capacity than apart.

The group anchor system 100 includes a plurality of vertical piles 130, such as helical piles, connected to a template 120. An embedded, optional skirt 110 fixed to the perimeter of the template 120 can be used to increase lateral load capacity. A mooring line (not shown) is attached to the template 120 by a mooring line connector 160. Any of a variety of methods, such as a padeye connection or a welded or flanged ball and socket style connector. The mooring line eventually connects the group anchor system 100 to the offshore asset. As a practical design approach, it is assumed that the vertical (tensile) component of the mooring load will be primarily resisted by the vertical piles and the lateral load component will be primarily resisted by the perimeter skirt. As such, the skirt is not a required component of the anchor.

The Helical Piles

Figure 5:
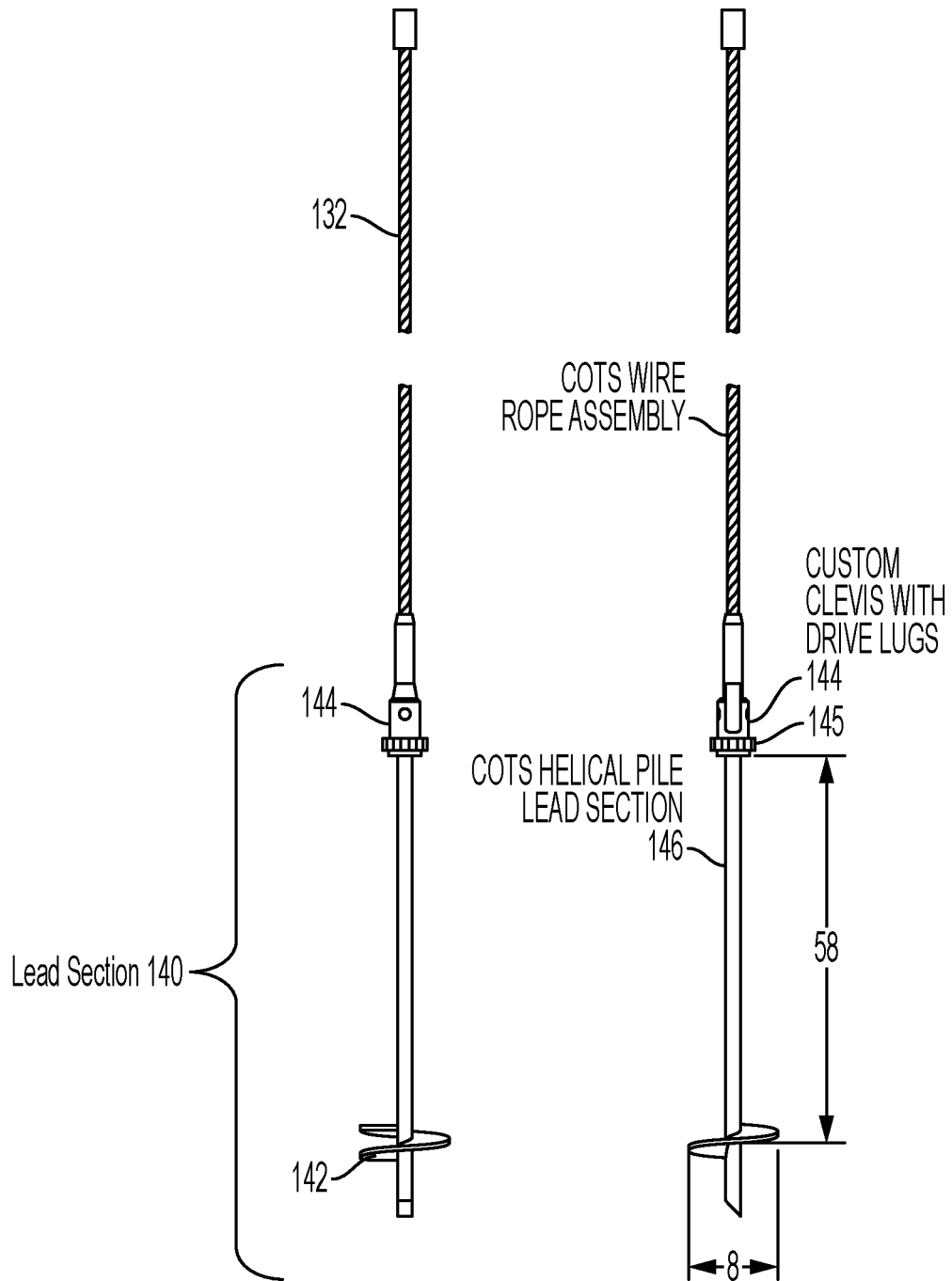

FIG. 2 depicts an exemplary helical pile 130. Each helical pile 130 comprises a lead section 140, comprising at least one helical plate 142 mounted on a rigid lead 146, a clevis 144, with drive lug 145, and a shaft 132. The clevis 144 affixes the lead section 140 to the shaft 132, and may take various forms depending on the type of lead and type of shaft. The drive lug 145 enables the installation tool 500 to engage and drive the helical pile 130, as described further below. The shaft 132 may be rigid or flexible. FIG. 5 depicts a flexible shaft in the form of a wire rope assembly. Each helical pile shaft 120 can be round or multisided (such as, but not limited to, 3 to 8 sides), solid or hollow shaft from the deep embedded plate to the template or a "flexible" shaft of any length (such as but not limited to 10-150 feet). The flexible shaft is achieved by a wire or synthetic rope from the lead section to the template or two or more rigid shaft sections connected by a flexible joint (not shown). A flexible shaft allows decoupling of vertical/horizontal loading to improve overall performance. This flexible shaft 132 can be made up of cable, synthetic rope, chain, multiple rigid shafts connected via one or more flexible joints, or a combination of two or more.

Each group anchor system may include a plurality of helical piles 130 such as 2 to 100 piles. The number of piles is chosen based upon the needs of a particular site, including but not limited to soil type, mooring load, depth, anchor type, size and shape of the template, etc. The helical piles may be arranged randomly or in a pattern. In some embodiments, the helical piles will be arranged about the periphery of the template. In some embodiments, the helical piles are arranged evenly to allow for even pressure and holding power.

Each pile may be of identical, similar, or different construction from the other piles. As will be appreciated from further reading of this specification, different pile structures are possible since the installation tool is module, and each module can be adapted to the characteristics of the pile driven by that module. The length of each pile can be identical or can vary between piles in the system. e.g. a single system could have 10 piles at 30 feet and 10 piles at 40 feet.

The number of plates in a helical pile can vary between piles in a system. For example, the system could have 10 piles with 2 plates and 10 piles with 1 plate.

Combinations of different lengths, different number of plates, different diameter plates can be used to optimize the system at different site conditions.

Each helical plate can be installed to any depth within the sea floor, and the length of the overall helical pile can be any length within the range above (about 10 to about 100 feet) as securement to the template can be provided by a swage, collet, connecting chain links or other methods. Piles within a group may be installed to a variety of depths to achieve design goals. This arrangement allows for the length of the piles to be adjusted as needed. For example, a pile can "let out" a bit in or "taken in" as needed.

The pile tip of each helical pile 140 includes at least one helical plate 142. Each helical plate 142 may include one or more turns (for example 1 to 5) for softer soils or utilizes a drill bit for rocky soils. Similarly, each helical pile may employ more than one plate. For example, 1-3 plates, each having 1-5 turns, may be used. The pile tip may include a sharp cutting edge, serrated edge, smaller helix, drill bit, a bulbous shaped extrusion, or other shape to aid penetration.

In some embodiments, the pile tip can flare out after install for low torque during installation and large area for holding force after install. This flaring, i.e. increase in horizontal area, can be achieved by folding plates that extend when pulled upwards, plates that extend out when the pile is rotated in the opposite direction, or by other means.

Additionally, tensioning devices such as springs, lock washers, cable stretch, or an installation system that adds tension with final turns can be used to put the helical piles in tension and distribute load once installed. That is, once in place, a final adjustment can be made to achieve the desired tension. A ratcheting or cam mechanism could be used such that any relative motion between pile and anchor would result in tightening.

The helical piles provide additional resistance to the skirt to resist movement and provide additional capacity over only an embedded skirt. For example, specifically placed helical piles can resist rotation resulting in higher horizontal capacity.

For multi-plate helical piles, the plates are typically spaced vertically at a distance of at least 3 times the diameter to minimize interactions between adjacent plates.

Leveling of the template and anchor system is achieved by monitoring angle during helical pile installation and adjusting pile motion to maintain desired angle. Although the installation tool allows for multiple or all piles to be driven simultaneously, the drive rate of individual piles can be adjusted to accommodate site differences and for leveling or other purposes.

The helical piles provide the majority of the uplift capacity for the system. Helical piles are installed by applying torque and crowd (down force) and screwing them into the seabed. Based on the site-specific soil conditions, the helical piles style, size and length will be determined for the optimal performance. Each helical pile comprises of a shaft, and a helical plate. Shaft lengths may range from approximately 5-100 feet or longer and may be made from multiple sections connected by couplers. The helical plate is designed and positioned such that twisting the anchor forces the shaft downward into the seabed. Multiple piles may be employed in a single anchor system held together via the template. Piles within a group may have the same or different plate diameter, shaft diameter, depth, and other independent characteristics through system modularity. The piles themselves maybe in pre-arranged locations or positions. The arrangement may be symmetrical or asymmetrical. In some instances, they are closely space, i.e. less than 5 diameters apparat from one another.

Commercial off the shelf (COTS) helical pile lead sections and shafts may be used. Shafts are either rigid or flexible and can range in diameter from 0.5" to 8". Helical lead sections are comprised of at least one helix in diameters ranging from 4" to 36". These sizes are exemplary and may be larger or smaller depending upon the application. Utilization of flexible shafts between the template connection and the helical pile lead section is innovative in that it decouples the skirt from the helices.

This design ensures the shafts are not at risk of buckling due to compressive loading or deformed due to bending moment.

The helical piles serve as the primary vertical load capacity. The innovative use of groups of helical piles in predetermined fixed locations, in combination with a template and skirt achieves required capacity as a group.

The tool and anchor are lowered to the seafloor as one unit, the helical piles are pre-assembled in the template and installation tool. The tool installs the anchor and releases afterward to come back to the surface for reloading of the next anchor.

The Template

The template 120 is a base platform that holds all the helical piles 130 together and provides a mooring connection 160 for the floating platform or to which the rigid components are connected. The template 120 also provides the base for the subsea tool 500 to sit on while each pile is installed. The template 120 is provided with a plurality of apertures, each of which is designed to accept and allow a helical pile 130, shaft 132, and installation tool 520 pass there through. This feature allows not only for easy install of a helical piles, but should one need to be replaced, an individual pile can be removed, without having to remove the entire template 120. The apertures can be positioned at strategic locations on the template, based on the particular site geography, or generically (e.g. such as along the periphery of the template). To complete installation, each helical pile can be secured to the template within its respective aperture by a decoupler to allow for securing the pile but also allowing subsequent removal, for example by a collar receiver weldment 154 and collar 152 (see FIG. 3). The receiver weldment is a feature that allows load transfer from the template to pile, and can be used to lock a pile to prevent uplift or allow piles to move independently. In some embodiments, the aperture (i.e. a template interface) may be a steel lined bore. The template will provide some uplift and lateral capacities but compared to the overall system will have relatively small benefits. The main purpose of the template is to provide stability and load transfer among helical piles, template, and skirt and to the mooring connection point.

The template can support single or multi-mooring connection points. The template can distribute load to one or more mooring attachments and/or a bridle can be utilized to distribute load. Single or multipoint connections could be sliding/rotating attachments involving pulleys, bushings that slide on a shaft, etc. Mooring connections may be in plane with the template or above or below the template.

The template is not merely an anchor plate for attaching piles and mooring lines. The template defines a plurality of apertures through which each helical pile passes through. Each aperture is placed at a predetermined location with intentional spacing between apertures, thus creating intentional spacing between piles. Unlike traditional anchor plates, the template provides a guide for installing the piles. Indeed, unlike other systems, the template makes contact with the seabead, and the piles are driven through the template into the seafloor and then secured to the template. The piles can be distributed in any arrangement, including but not limited to even spacing; symmetry provides benefits. Helical piles can be installed directly down from the template or off at any number of specified angles to improve capacity or otherwise affect performance characteristics. Individual piles maybe at identical, similar, or different angles, depending on the needs of the site. Helical piles may be assembled into the template with the helical plate below the template such that only the shaft passes through or the plate may be driven through the template using specially designed helical apertures that allow the plate to pass through while maintain tight shaft location control. The aperture may consist of angled or straight slots or other openings to allow the helical plate to pass through vertically or while turning. The openings may be fixed in place or may slide or flex rotationally or translationally, in plane, or out of plane to allow the plate to pass. A large aperture could allow the helix to pass through and then be reduced to hold the shaft tightly with a plug or other means. The plug could be mounted on the pile shaft above the helical plate.

The template can be made of any material including metal, concrete, or synthetic and fabricated in any configuration including trusswork, webbing, framing, solid plate, multiple plates, or layered sheets or beams.

Suction can be applied to the skirt and template in addition to the helical piles to increase capacity or aid installation, for example in clay soils.

The template comprises a base portion that may be made of any suitable material, such as, but not limited to concrete and/or metal. The template engages and connects each of the multiple anchors together as a system. The template and anchors may be transported separately and assembled in place, making the system easy to transport, use, and install, as well as making it scalable depending on site needs. The template comprises a base portion that may be made of any suitable material, such as, but not limited to concrete and/or metal. The template engages and connects each of the multiple anchors together as a system. The template and anchors may be transported separately and assembled in place, making the system easy to transport, use, and install, as well as making it scalable depending on site needs. The system can be shipped disassembled to the installation site and assembled on deck or under water, depending on need.

The template is manufactured into either a truss framework or of a solid plate or a combination of both. The template secures the helical piles to the skirt and to the mooring connection. The template predefines the helical pile locations in proximity to each other and to the skirt and the mooring connection point. The template is also designed as a through-connection point for the helical piles. The helical piles, template, and skirt are installed together as one unit with the helical piles through-template position as the innovative design. The top center of the template is adaptable to a multitude of connection types that are used across the mooring industry including a trunnion, padeye, and a ball and socket.

Trunnions or padeyes will be directly welded to the template center. A ball and socket connected can either be mechanically secured to the template structure via welding, bolted flange, or integrated permanently through the template support structure.

The Skirt

In some embodiments, a skirt 120 is provided to increase lateral capacity of the system and for other purposes. The skirt 120 generally projects towards and through the seabed from the outer periphery of the template. The skirt may be integrally formed with the template or may be attached separately. The skirt and template together form a hollow structure which is embedded into the seabed.

The skirt comprises an exterior shell ranging in size and thickness attached to the circumference of the template, made of suitable material which includes but is not limited to metal, polymer, or concrete. Such systems can include a "skirt", and the skirt will be self-installing by the helical piles. The skirt is installed such that it is embedded into the seabed. In some instances, the skirt extends at least as deep as the helical pile. The length of the skirt (i.e. depth to which it is embedded) depends on the use as well as site conditions. In some instances, the skirt length is less than the depth to which the helical pile is installed. In some instances, the skirt length is greater than the depth to which the helical pile is installed. In some instances, the skirt length and the depth to which the helical pile is installed are nearly identical. In some instances, the skirt length is 10%, 20%, 30%, 40%, 50%, 60%, 70%, 80%, 90%, or 100% of the depth to which the helical pile is installed. In some embodiments, the length may be up to 1000% larger. The length may be any of these or a range between any two of these values. The skirt may follow the geometry of the template, and thus may be circular, triangular, polygonal, cone, pyramid, cross, or cylindrical shell in nature. Any shape may be used depending on the needs of the site and the application. In some embodiments, the anchor system employs flexible shafts (e.g. rope, wire, etc.) that connect from the template to the helical plate. In other embodiments, the anchor system employs rigid, hollow or solid, shafts having any suitable cross-section but particularly circular, square, star, or hexagonal shape. In some embodiments each of the helical piles may independently comprise a single plate or multiple plate configuration.

The skirt is manufactured by either a roller similar to caisson technology or in multiple sides that are welded or bolted together or made by casting or other means. The polygonal skirt is comprised of 3 or more sides concentric about the center. Each side is either flat, curved, or corrugated. A single plate of steel can also be bent into multiple sides before being welded to the additional skirt panels. The skirt is manufactured with a through-hull access point for deck-fit up and transportation. When the skirt is manufactured by a steel roller/is designed in a cylindrical fashion, it is modelled and behaves like a cylindrical shell (High diameter over thickness ratios D/t). This is possible due to the innovative installation method reducing or eliminating driving or negative pressure forces during installation thus keeping the skirt, and therefore the entire anchor, lightweight.

The skirt can be one large exterior diameter of the full system or can be on each individual helical pile.

Additionally, the skirt can be circular or made up of multiple flat or curved sides (3 or more sides) or even consist of flat plates that cross to form an X or other shape as long as the create a vertical bearing surface. The skirt may be solid or include openings or separate sections. The sides can be perforated, staves, or expanded metal.

The skirt can extend straight down vertically or at an angle. It can also include a difference in thickness and nonuniform shape at the tip including a sharp cutting edge, serrated edge, or a bulbous shaped extrusion to aid penetration or for other purposes.

Length of the skirt can be 10% of the template diameter up to 1000% of the template diameter.

Within the skirt, internal bracing, ribs, and bulkheads can be included for strength.

Embedment of the skirt is performed by either self-weight, jetting, suction, vibration, or using the helical piles as a method for "jacking" to pull the skirt into the soil. The helical piles would be used as a reaction platform with the installation tool providing the jacking force.

To reach full embedment, the installation forces must be equal to or greater than the soil resistance which is a comprised of the tip bearing capacity and the side friction of the skirt. Helical piles are the primary method in installing the skirt component of the anchor. Note that the helical piles can be removed after skirt installation without affecting the skirt. Thus the skirt and/or template could be left behind as the anchor if desired. The top of the skirt could be closed or open, a closed top provides additional holding force. The piles are installed to the necessary depth using the installation tool, and then used as a reaction force as the installation tool provides upward force (opposite of what is used to install the helical piles) on the piles and consequential downwards force on the perimeter of the skirt. The downward force on the perimeter of the skirt is quantified using soil mechanics and foundation engineering fundamentals and used in design and installation analyses of the system.

Extending flaps that resist vertical, rotational, and/or horizontal loading can be included on the skirt to expand once under tension to provide additional holding capacity without increasing installation forces.

Figure 9:
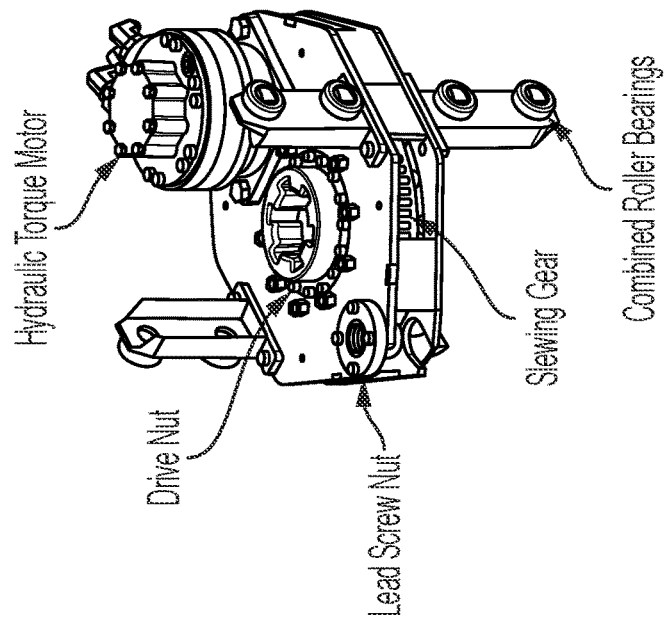
FIG. 9 depicts an exemplary moving platform in accordance with FIG. 8.

In some embodiments, such as shown in FIG. 9, multiple "mini" skirts 111 may be employed. As shown in FIG. 9, each helical pile 130 includes its own inner skirt 111 and a larger skirt 120 is provided around the entire array of helical piles. In some embodiments, one or more of the helical piles may be provided with a skirt and a second, outer skirt is provided around the entire anchor array. In other embodiments (not shown), two or more helical piles may each be provided with its own skirt of any size.

The group anchor system, including a skirt can be installed by driving the piles through the template and into the seabed, thereby pulling the skirt into the seabed. In some embodiments, the piles may then be removed, using the skirt, alone, to hold the template and anchor system in place.

The Installation Tool

The tool drives from the anchor connectors in the middle portions of the anchor sections or by gripping the anchor shaft.

The system is innovative because it provides both measured crowd and torque to the anchor to provide a smoother more effective install and provide holding force information. By collecting installation forces, in-situ capacity can be determined without proof testing of the anchoring system. The system drives the helical pile into the ground from middle connecting sections while the full pile is already assembled. It is done without a user controlling hydraulic motors with a hand lever. It is done with a remotely automated software program using torque/crowd and advancement rate as feedback.

It is also possible to move one or more drive heads between anchors rather than having one drive head per anchor. Likewise the system could in some cases push from the top of the anchor rather than the center. The piles can be pre-assembled, but they could also be assembled from sections during installation by the robotic mechanism.

The installation tool is made up of a number of parts, many of which are used in their conventional manner and are not fully described herein. The installation tool may include one or more of a subsea hydraulic power unit, subsea communication bottles, offshore rated support structure/lifting points, self-leveling legs, anchor disconnection/alignment guides, and modular drive train systems comprising: torque heads driven by hydraulic motors, guide rails, acme rods (or screws) driven by hydraulic motors providing downward force, and various monitoring sensors. The tool is made up of purchased and machined parts, substantially metal construction with motors, bearings, location/pressure/torque sensors, bearings, acme rods, guide rods, linear actuators.

To install the anchor system, the system utilizes a special installation tool 500 that is quick connected to the template 120 and helical piles 130 during installation and disconnected afterwards remotely. The tool 500 is modular and includes several tool modules 501 with drivers 550 which provide torque and crowd to install the piles 130. The modules 501 can push down, up and rotate the helical piles 130. These modules 501 coincide with the locations of the piles in the template 120, with one module per pile. The modules can be controlled independently allowing for one or more piles to be installed simultaneously or driven independently or even backdriven for example to level the anchor system or control installation angle. Each module is interchangeable allowing for quick replacement if a module was to malfunction. Alternatively a single drive unit or a smaller number of drive units could be used with a mechanism to move the drive units between piles, but the most benefit is achieved when multiple piles can be driven simultaneously.

The modules 501 can drive the helical piles 130 by gripping the pile at any location or via connectors at midpoints along the pile shaft or at the ends. Existing systems typically drive pile from the upper end of the pile. These connectors can create a smooth continuous shaft surface or have a lugged geometry which the drive head can interfaces with to transmit both multidirectional crowd and torque to the pile. The module drives each connector in series moving from one to the another driving the pile into the ground in sections. The module and drive head are capable of driving the connectors and piles in both directions enabling the tool to both install and extract the piles. The drive head and pile shaft connectors mate with each other so that the drive lug can turn the shaft, which in turn drives the helical plate. Pile shaft connectors and lugs are placed along the length of the installation tube, typically connecting adjacent and shorter lengths of installation tube sections. Lugs may include a pin, hole, spline, faced section with one or more flat surfaces, grooves, or other mechanical interfaces to aid translational and rotational force transfer.

In addition to the lugged drive head the tool modules could also utilize a roller based drive head. The roller based drive head eliminates the need for connectors and can drive the pile at any point along its length. This approach uses toothed/knurled rollers to grip the exterior of the helical pile. These rollers are driven to transfer torque and crowd to the pile. Two or more sets of rollers engage the shaft of the helical pile too drive the pile into the ground. One or more of these sets are perpendicular to the axis of the pile when these rollers turn crowd force if provided to the pile. One or more rollers are positioned parallel to the axis of the pile, when these are driven, torque is applied to the shaft. In order to provide adequate force between the rollers and the shaft, to accommodate multiple shaft sizes, and to make way for upsets in the shaft, the rollers can be actuated toward and away from the pile. The roller is capable of being driven in both directions enabling the pile to be driven in both directions facilitating both installation and extraction.

The number of modules matches the number of helical piles in the anchor. There is no limit to the number of modules. The spacing of the helical piles allows for drive modules to be placed at the correct locations. The modules include attachment points that allow them to be assembled to each other such that modules can be added or removed as needed.

The tool, including its multiple modules is approximately the same diameter, or dimension, as the anchor. The height is dependent on the length of anchor sections used based on the crane height available for installation, 10-30 feet tall tool. The helical piles will stick out of the top of the tool.

Sensors are on all the hydraulic motors, top and bottom of the module travel and on the drive mechanism. The sensors monitor position, speed, torque, force, angle, etc. to support monitoring and autonomous or semi autonomous operation.

The tool can install preassembled piles or assembly the piles during installation.

The tool features an exoskeleton that is designed to hold the modular units together with the anchor and keep piles aligned. The exoskeleton is comprised of truss and lattice work that serves as the main handling component of the anchor system. Rigging is secured to this structure for lifting and sliding.

The exoskeleton is designed to support the weight of the tool and the anchor in the vertical and horizontal orientations or during rotation from horizontal to vertical and vertical to horizontal. Assembly of piles, template, and other tool components with the exoskeleton may occur while horizontal or vertical.

This exoskeleton gives the anchor the ability to be handled by a crane, deck tuggers, or by winches. It also gives the ability for the tool and anchor to be deployed over a stern roller or a point on the vessel where the anchor will rotate about during overboarding or righting.

The modular tools feature alignment pins for easy assembly and connection to the anchor.

The tool can be attached to the anchor out of the water and in the water. Additionally, the tool can detach from the anchor out of the water and in the water.

The main driving units of the tool can either be hydraulics or electrical power. Power units can either be contained within the tool, separate but subsea, or on the surface and interfacing through a tether/umbilical.

Some embodiments convert electrical power subsea from the tether/umbilical into hydraulic power to use to install the helical group anchoring system. Some embodiments will also communicate over the tether/umbilical. The present disclosure will provide both torque and force to install the helical piles.

Some embodiments will include a subsea hydraulic power unit, subsea communication bottles, offshore rated support structure/lifting points, self-leveling legs, anchor disconnection/alignment guides, and modular drive train systems consisting of: torque heads driven by hydraulic motors, acme rods (or screws) driven by hydraulic motors providing downward force, and various monitoring sensors.

Some embodiments will drive the anchors into the seabed at intermediate sections rather than from the top of the helical pile. The intermediate sections could be 5-20 foot long sections, with a total installation length of over 100 feet or as little as 5 feet. Installation length will be determined by the site-specific conditions. The drive system combining the torque and force methods will be on a modular scalable unit to accommodate any size helical pile and different group sizes.

Some embodiments will have the ability to install multiple helical piles at the same time into the seabed. The other helical piles will provide counter torque to the pile or piles being installed.

Depending on the seafloor conditions, some embodiments could include self-leveling legs. The legs will provide additional support for land out and initial installation while the helical piles have installed to a depth that is sufficient for further installation without the legs. The self-leveling legs will provide the ability to install the anchor level to the loading path. The self-leveling legs will also provide an initial counter torque reaction point for the initial helical pile installation.

Some embodiments will have the ability to install both standard rigid helical piles and flexible helical piles. In the case of flexible helical piles, the tool will pull out the installation string, leaving only the helical plate and the flexible shaft (e.g. wire, rope, chain, rigid rods with hinges, etc.) behind for connection. A combination of rigid and flexible may be used.

Some embodiments will provide feedback to the user on the surface vessel. Some embodiments will have automated and user-controlled installation process based on unit feedback from sensors.

FIG. 1 is a perspective view of an installation tool, and group anchoring system in accordance with embodiments herein, the inset shows a installation tube connector with drive lug.

FIG. 2 is a perspective view of a group anchor system in accordance with some embodiments with skirt shown in partial cut-away.

Figure 3:
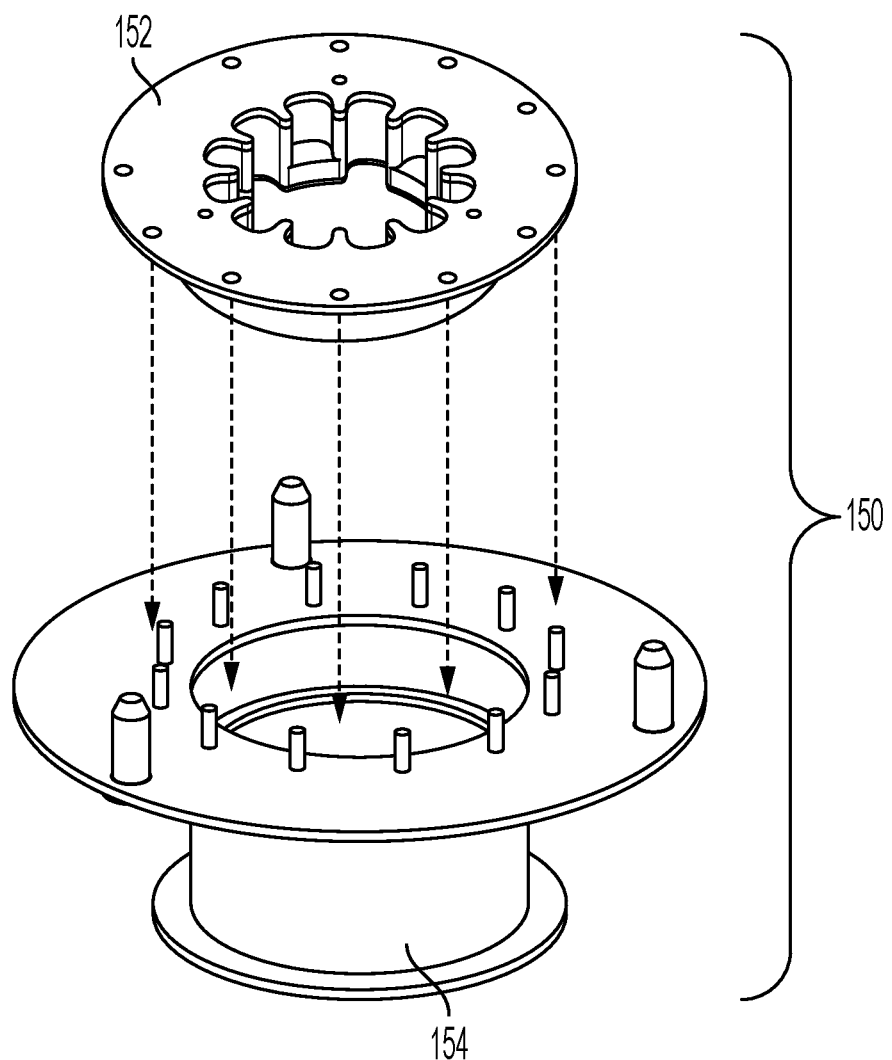

FIG. 3 is an exploded view of a receiver weldment in accordance with some embodiments.

FIG. 4 is an alternative embodiment of an anchor system in accordance with some embodiments.

FIG. 5 depicts a helical pile with a flexible shaft.

Figure 6:
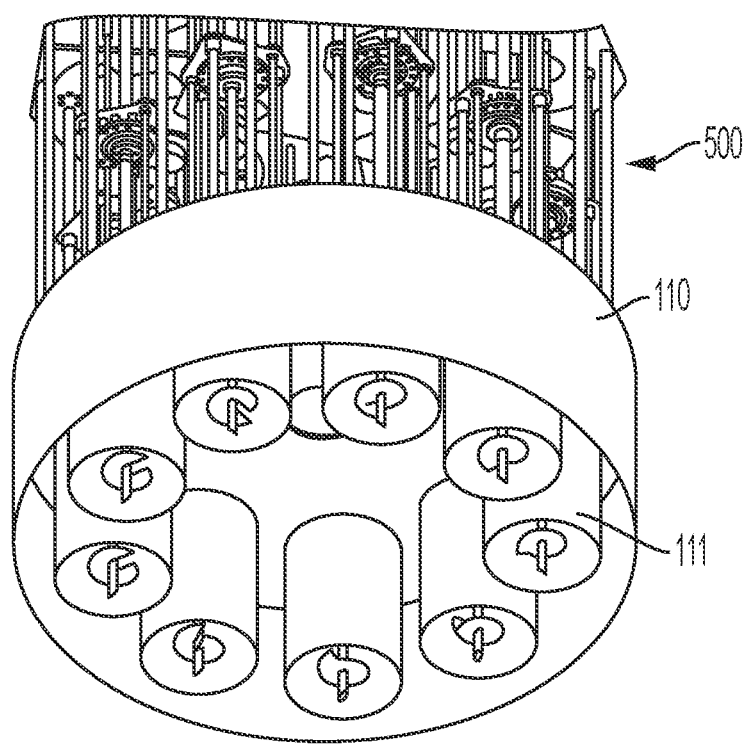

FIG. 6 depicts a perspective, underside view of a group anchor system employing inner and outer skirts, affixed to the installation tool.

FIG. 7 is a perspective view of an installation tool in accordance with some embodiments.

Figure 8:
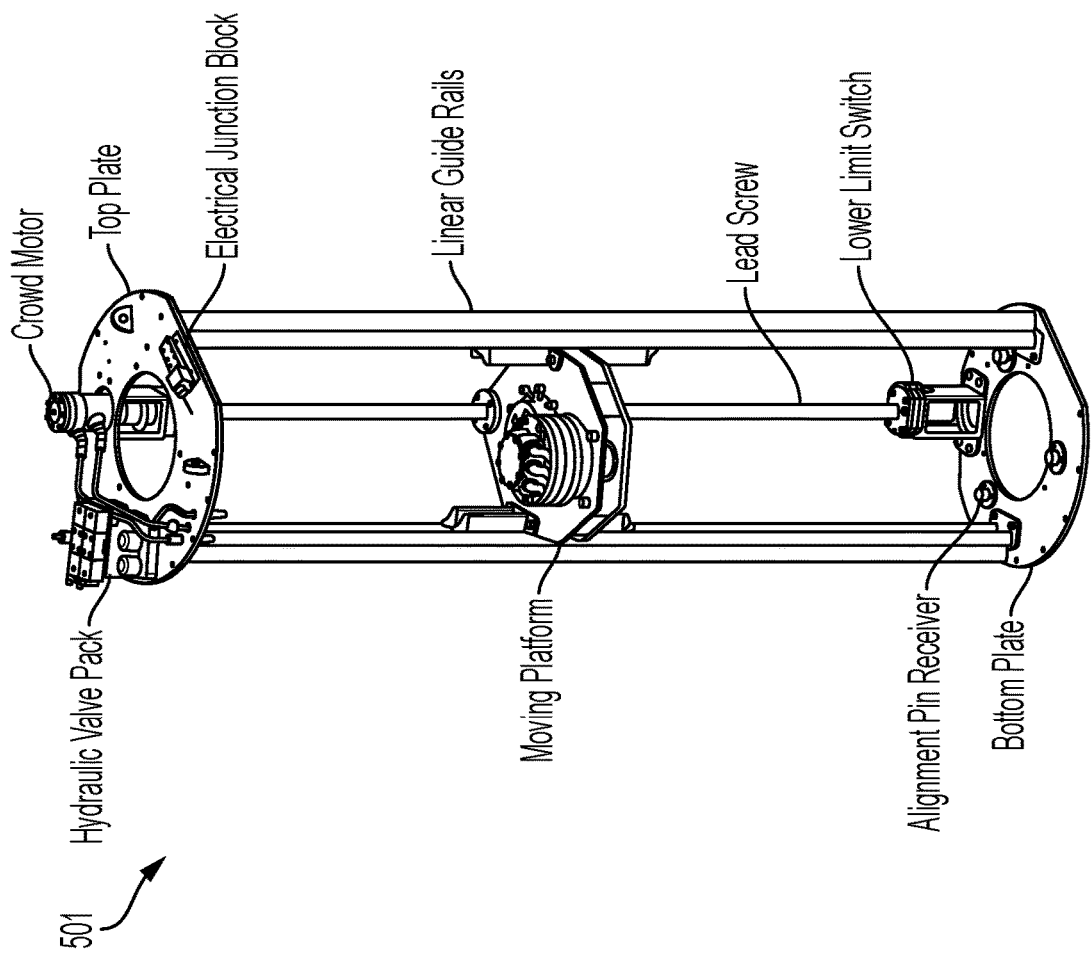

FIG. 8 depicts a module of an installation tool in accordance with some embodiments.

FIG. 9 depicts the moving platform of a module of FIG. 8.

Figure 10:
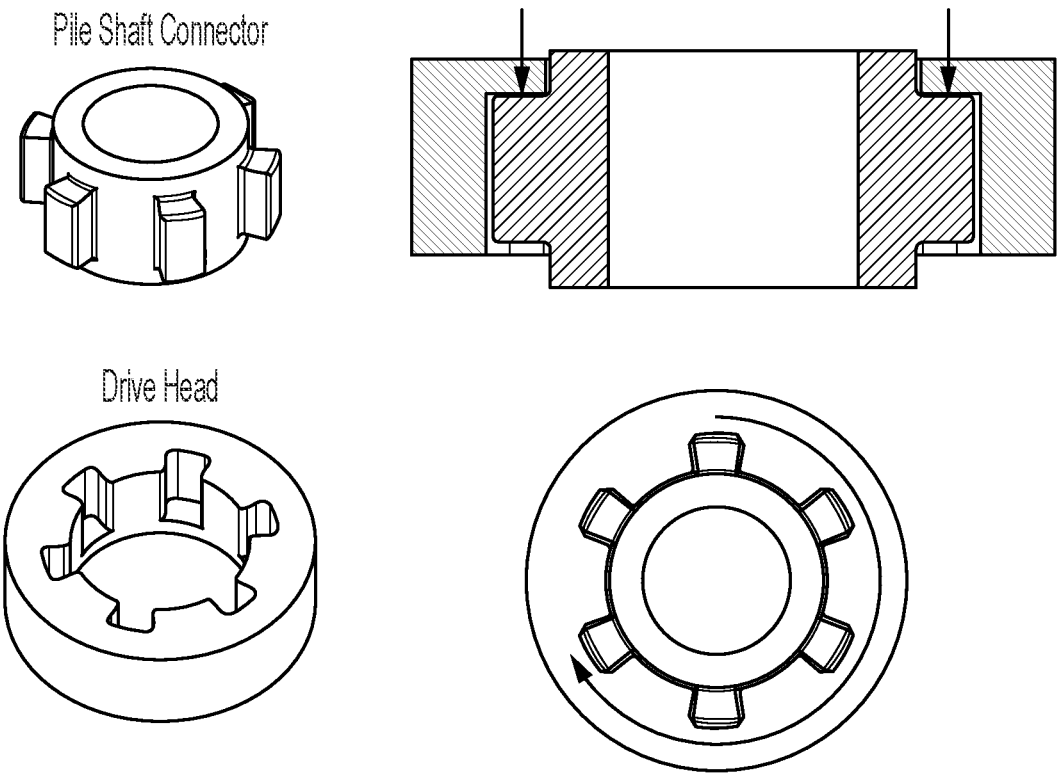
FIG. 10 is a depiction of exemplary mated parts of a lugged drive.

FIG. 10 depicts the shaft connect lug and the drive head as well as their interrelation during driving action.

Figure 11:
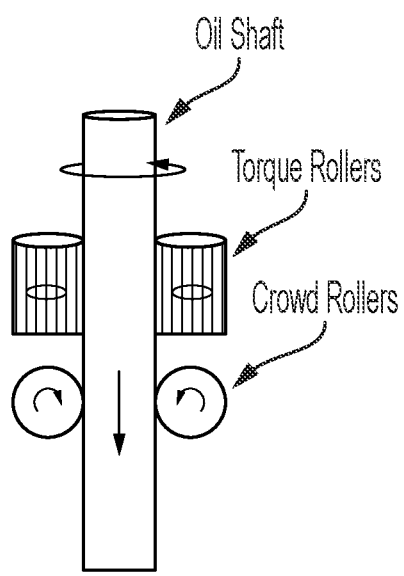
FIG. 11 depicts an alternative drive mechanism comprising rollers for grasping the side of pile shaft to drive it into or out of the seabed.

FIG. 11 depicts an alternative roller based drive mechanism.

FIGS. 12-19 show an exemplary helical pile system 100 and the installation tool 500 and methodology of the installation tool. Optional features, such as self-leveling feet are removed for picture clarity.

Figure 12:
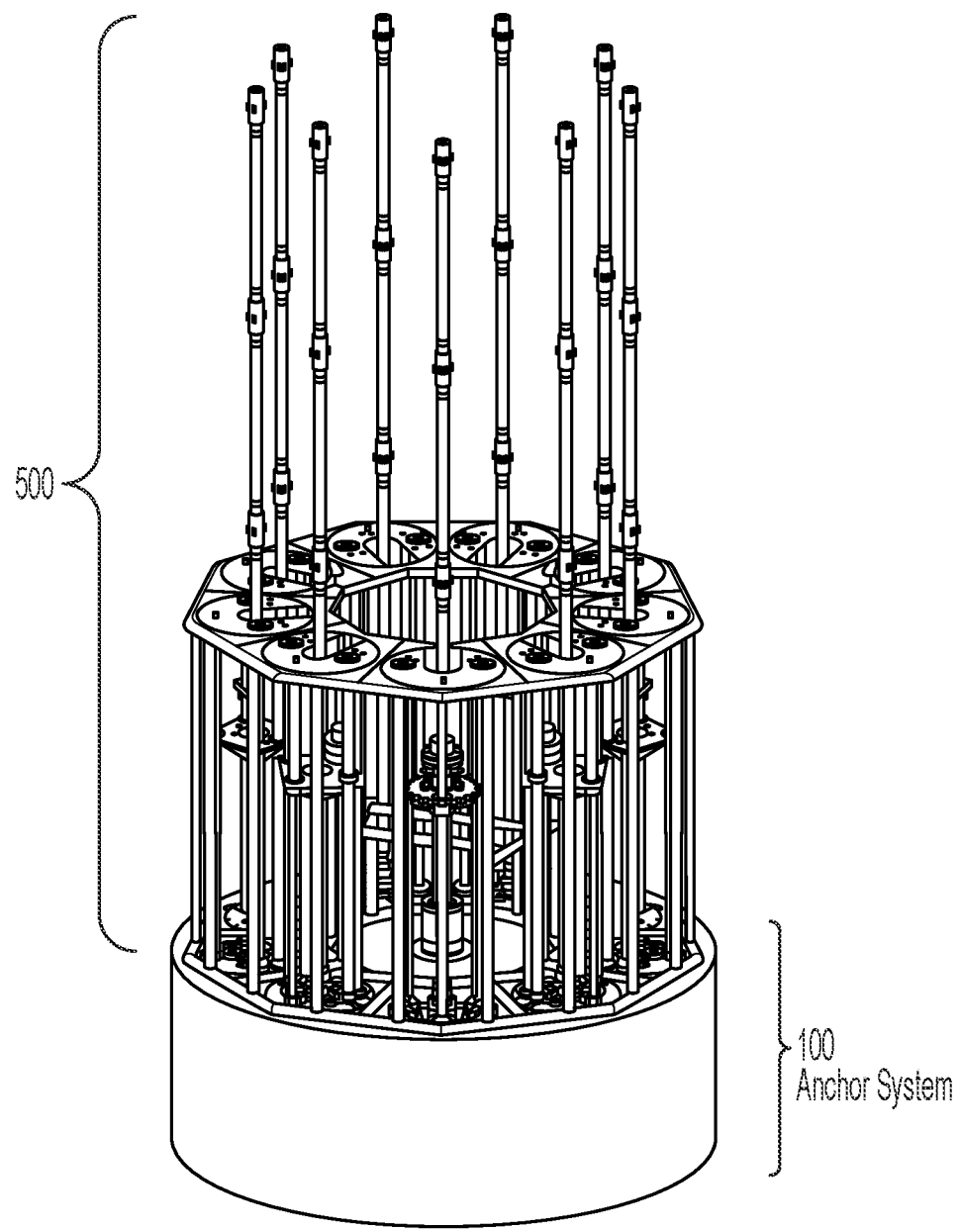
FIG. 12 shows the Tool connected to the group anchor prior to installation.

FIG. 12 shows the installation tool connected to the group anchor system prior to installation. The installation tool 500 includes exoskeleton frame 510, a plurality of drilling shafts 520, each of which comprises multiple components (520*a*, 520*b*) to achieve the desired length. The anchor line 132 is allowed to pass within the drilling shaft 520. FIGS. 2-8 illustrate the installation process. In some embodiments, the anchor system 100, is embedded in the seafloor, such that the skirt 110 is embedded below the seabed floor, and the anchor template 120 engages the seafloor. The template may also be embedded below the seafloor in some cases. The helical piles 130 are embedded in the seafloor to the desired depth depending on the application and the site conditions.

Figure 13:
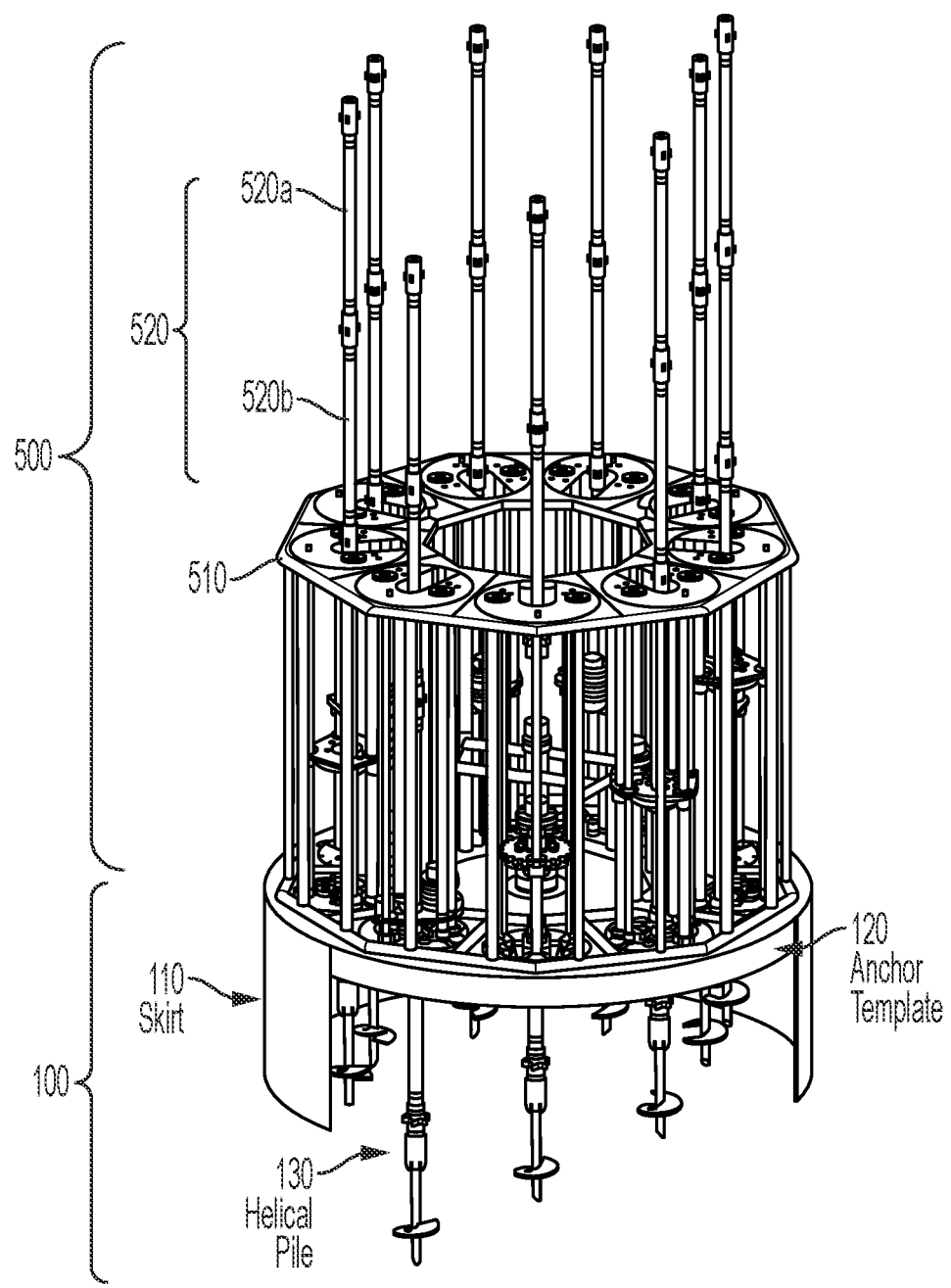
FIG. 13 shows the tool starting to install helical piles.
Figure 14:
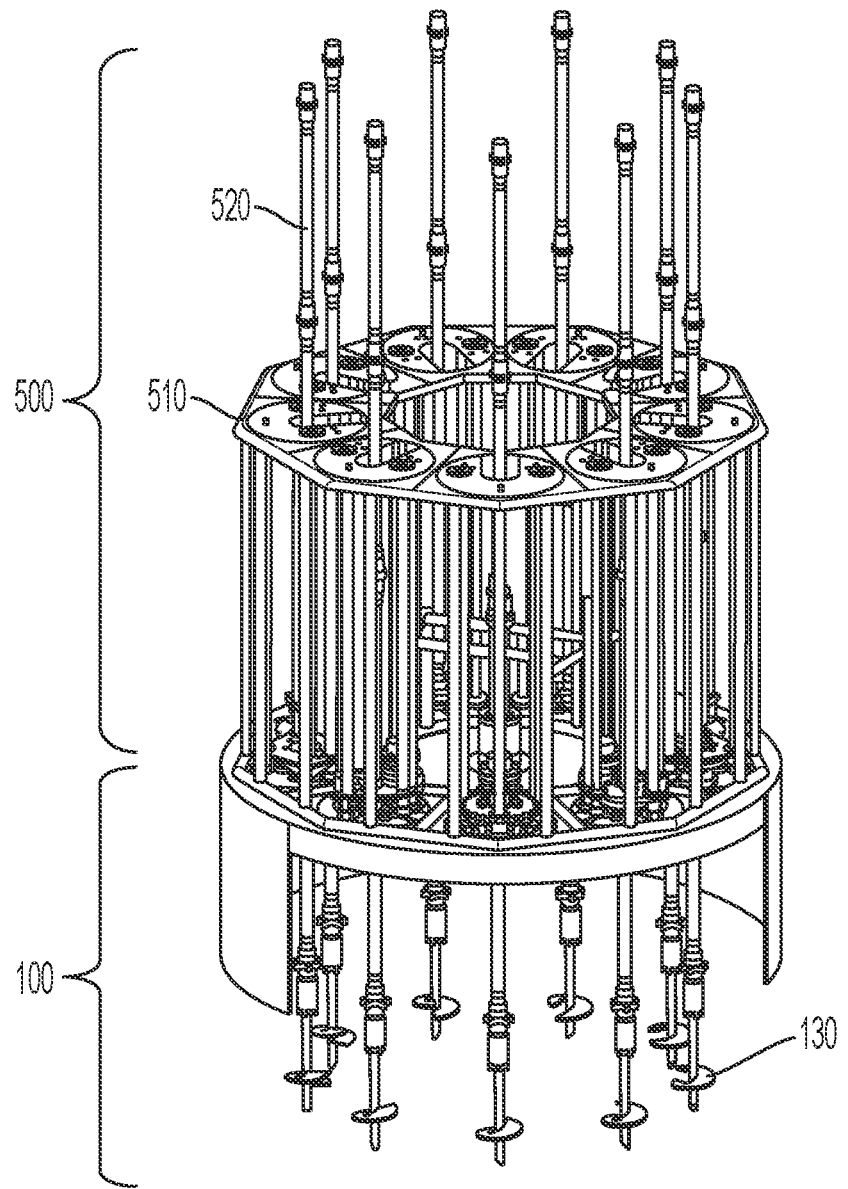
FIG. 14 shows all helical piles being driven into the ground
Figure 15:
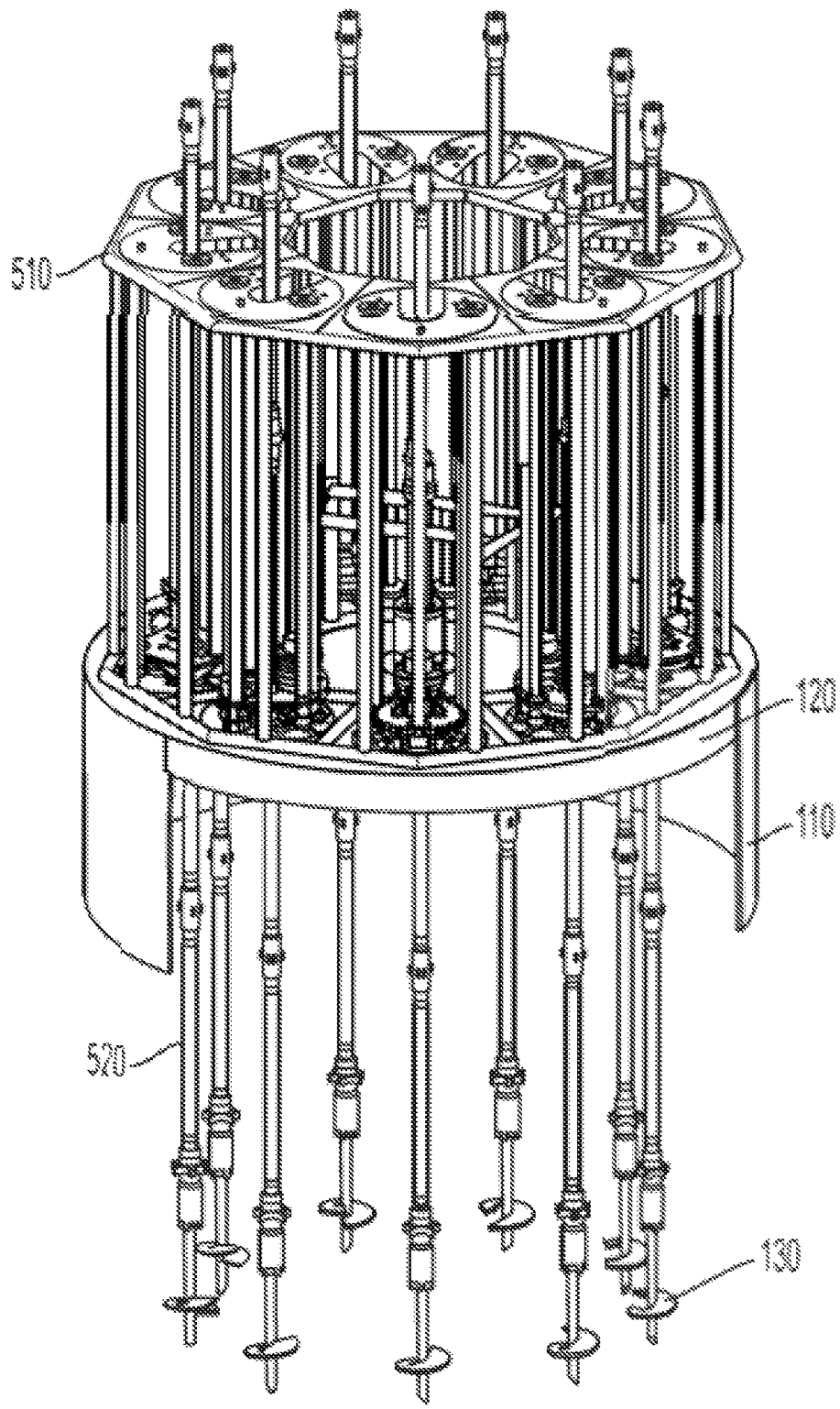
FIG. 15 shows the continued installation of helical piles
Figure 16:
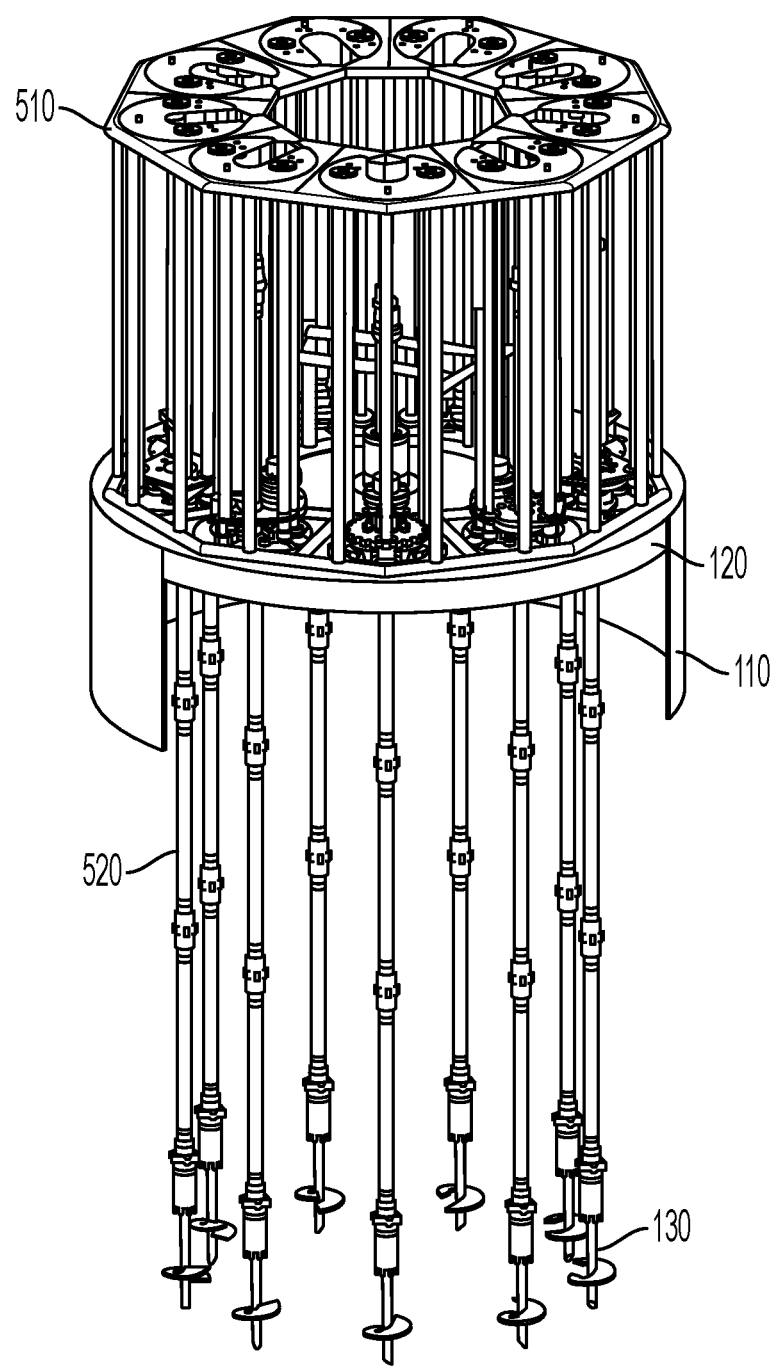
FIG. 16 shows the stage where all individual helical piles have been installed to maximum embedment length

FIGS. 13-15 show the drilling shafts of the tool moving downward, and it drives the helical piles 130 into the seabed. In each successive figure, the drilling shafts have moved downward, as have the helical piles 130. FIG. 15 continues this movement, with the drilling shafts being obscured from view by the exoskeleton 510. FIG. 16 where all individual helical piles have been installed to maximum embedment length. Importantly, the system allows for each individual pile to be driven independently, meaning they all could be driven to the same depth as shown, or some could be drive to shorter lengths to accommodate site conditions. Further, driving each pile may be stopped at any point during pile install and the pile may be bound to the template at that point. That is, the length of the pile could be predetermined or dynamically determined during install.

FIG. 16 shows a fully installed pile just prior to beginning removal of the installation tool.

Figure 17:
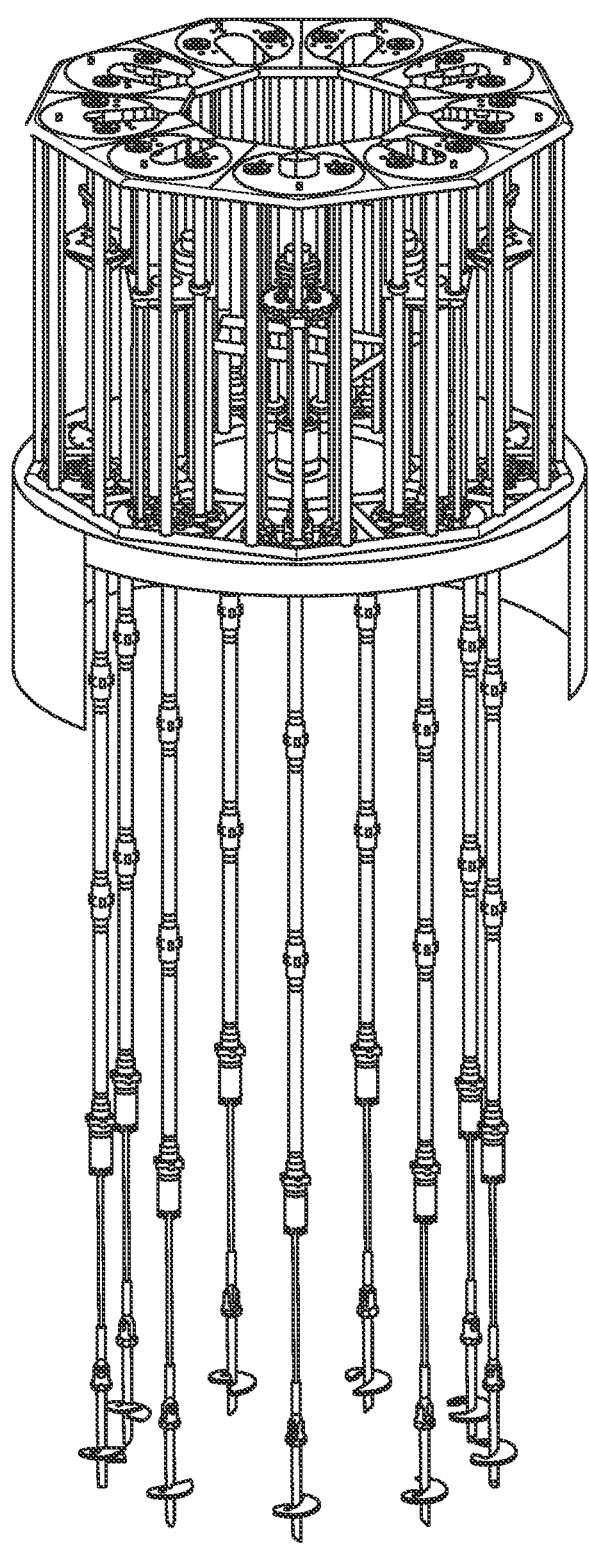
FIG. 17 shows how shaft portions are pulled out leaving the helical plate embedded (if using flexible anchors only)

FIG. 17 shows how drilling shaft portions are pulled upward, leaving the helical plate embedded (in the case of flexible anchors as shown).

Figure 18:
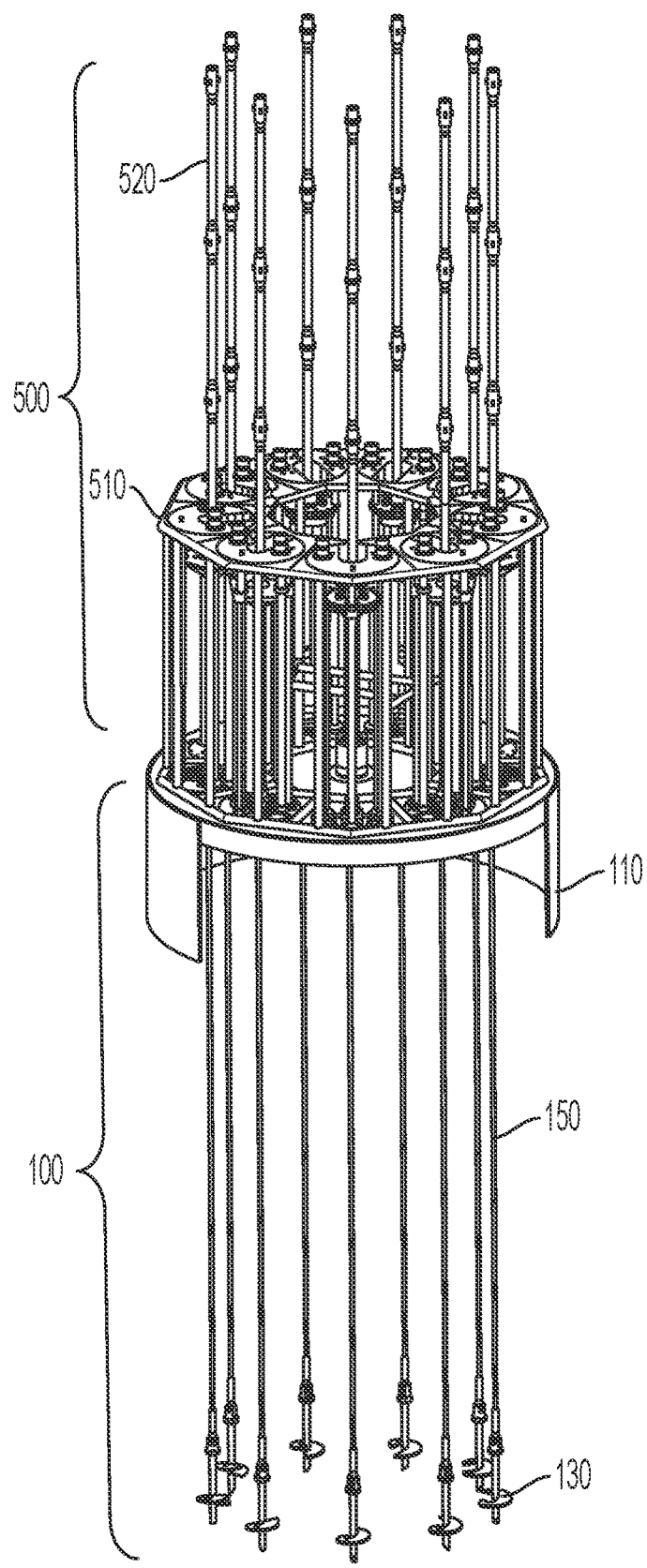
FIG. 18 shows how all drive shafts are removed (if using flexible anchors only)

FIG. 18 shows all drilling shafts removed (if using flexible anchors only).

Figure 19:
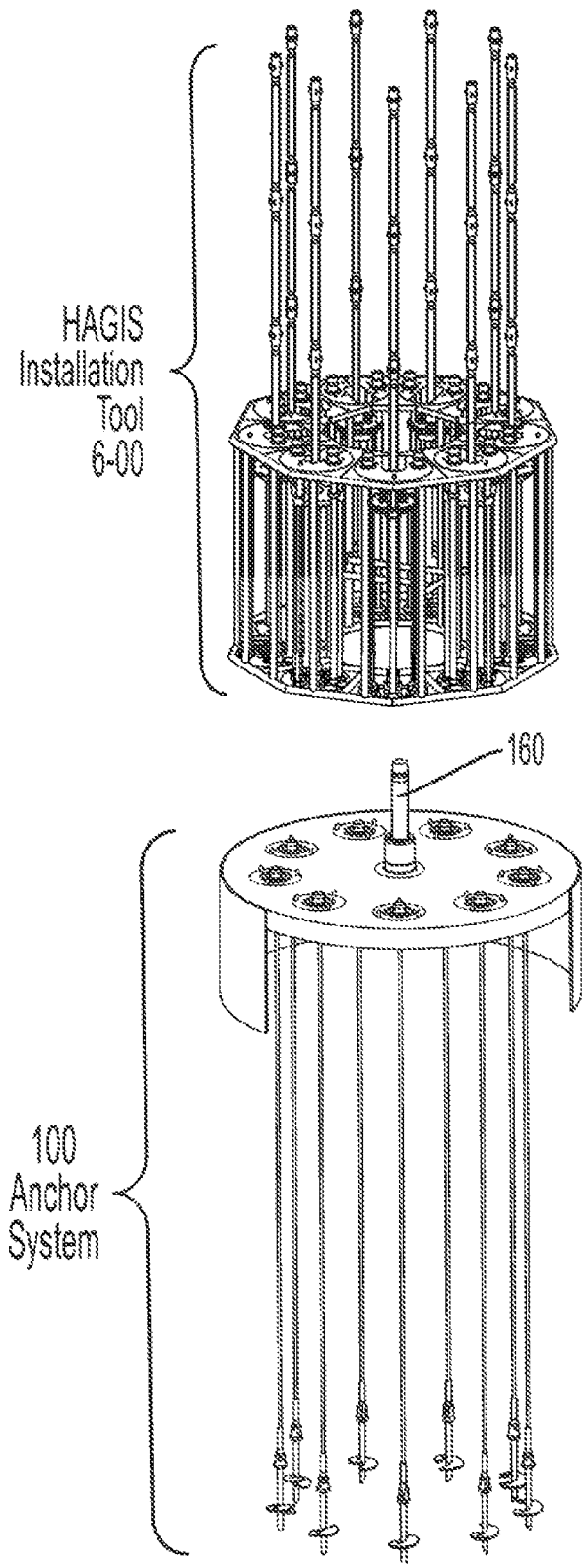
FIG. 19 shows how the tool disconnects from the group anchor to leave behind for mooring connection

Finally, FIG. 19 shows the installation tool 500 disconnected and removed anchor system 100 to leave behind for mooring connection via connector 140.

Although the figures depict removal of the installation tool, leaving the flexible piles behind attached to the template, in some embodiments, the helical piles may be used to pull the template and skirt into position to the desired depth, and the piles may be removed along with the installation tool, by reversing the operation, to leave only the template and skirt behind.

Transportation & Fit-up

Unique to the anchoring system is the transportability of each component. The tool, skirt & template, and helical piles are sent offshore separately. The tool(s) is onboard the installation vessel during operations. The skirts and template are combined onshore and transported offshore by either the installation vessel or a supply vessel or a barge. Skirts can be stacked on top of one another without the need for welding or bolted connections. By stacking skirts, more anchors can be transport offshore per vessel reducing emissions, time, and costs.

Helical piles are transported onshore and offshore in components and assembled offshore with the tool before deployment. Helical lead sections are transported on racks and helical piles in open-top containers.

During offshore deployment, the helical lead sections are set in a helical pile deck template. Then, the skirt is set on the installation vessel's work deck on in a skirt cradle. Mooring connection leads are connected to the skirt. The tool is lowered onto the skirt and engages the quick connectors locking the tool to the skirt.

Inside the skirt, the deck template working platform with lead section cradles is raised to the bottom of the template, inside and at the top of the skirt by actuators (hydraulic or electric). With the lead sections fixed to the helical piles in the skirt, the deck template is lowered back to deck and the structure is ready for deployment.

Overboarding & Installation

The tool 500 and anchor system 100 are deployed subsea together. The system is lowered to the seafloor as one unit via the vessel/barge crane, anchor winch, frame, or a system specific LARS.

To assist positioning and anchor orientation, the systems sensors, cameras, and thrusters can be utilized via tether or through ROV interface. The tool can be operated through a control panel via remotely operated vehicle (ROV) interface. Once the ROV is stabbed into the tool, the tool begins automated installation functions. Alternatively, wired communications with the surface could be used to operate the installation tool via tether or umbilical. The system will allow for monitoring and control of all factors of installation, including but not limited to crowd speed, rotational speed, pile angle, anchor level, etc. The various sensors may be used to determine holding capacity, and other important properties.

If needed, the system may self-level by advancing or retracting specific piles while holding others still. Once level, the tool can advance all of the helical piles into the seabed simultaneously.

The helical piles will pull the skirt and template into the seabead. Torque, crowd, and helical pile advancement rates are installation components calculated and measured for installation operations.

Unique to the installation tool is the ability to provide the required torque and crowd force to install each helical pile simultaneously. Capacity derived from installation torque requires a specific advancement rate to achieve optimum holding force, generally >85% of the helix pitch. This means that as each helical pile is installed, it must advance into the seafloor at least 85% of the pitch (vertical distance of one revolution of the helix) to ensure over-flighting or augering does not apply. This is controlled by providing enough crowd force. Crowd force ensures the helical pile has enough mass to resist the upward force of the soil on the helix at it is rotated into the seabed. The amount of crowd force that needs to be provided by the installation tool is approximately 1 kip per 1,000 ft-lb of installation torque needed.

The tool can be equipped with hydraulic actuators that have leveling feet to support the direction the anchor is installed.

Once final torque is measured and the anchor capacity is correlated, the tool will lock the helical piles to the template and the tool disconnects form the template and is recovered to deck.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $\frac{1}{10}$ of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

EMBODIMENTS

1. A system for installation of one or more piles, wherein the system drives anchors into the seabed at intermediate sections rather than from the top of the pile, wherein installation of the piles occurs subsea at deep ocean depth with subsea tooling. Other embodiments are used at shallow depths.

2. The system of embodiment 1, wherein the one or more helical piles are in a single configuration.

3. The system of embodiment 1, wherein the one or more helical piles are in a group configuration.

4. The system of embodiment 1, wherein the helical piles secure a floating offshore asset.

5. The system of embodiment 1, wherein the helical piles secure a fixed offshore asset.

6. The system of embodiment 1, wherein the installation uses standard offshore vessel spreads.

7. The system of embodiment 1, wherein the system includes a subsea hydraulic power unit.

8. The system of embodiment 1, wherein the system includes a topside hydraulic power unit.

9. The system of embodiment 1, wherein the system includes subsea communication bottles.

The system of embodiment 1, wherein the system includes offshore rated support structure/lifting points.

11. The system of embodiment 1, wherein the system includes self-leveling legs.

12. The system of embodiment 1, wherein the system includes anchor disconnection/alignment guides.

13. The system of embodiment 1, wherein the system includes modular drive train systems.

14. The system of embodiment 12, wherein the modular drive train system comprises:
  torque heads driven by motors, which may be hydraulic or electric, motors attached drive to acme rods or linear actuator providing downward force, and various monitoring sensors 15. The system of embodiment 1, wherein the intermediate sections are 5-20 feet in length.

16. The system of embodiment 1, wherein the total installation length is over 100 feet.

17. The system of embodiment 1, wherein the total installation length is over 5 feet.

18. The system of embodiment 1, wherein the system additionally comprises a group anchor which includes a skirt.

19. The system of embodiment 17, wherein the skirt is self-installing or may be pulled in by the piles 20. The system of embodiment 1, wherein the piles are rigid helical piles.

21. The system of embodiment 1, wherein the piles are flexible helical piles.

22. The system of embodiment 1, additionally comprising an automated installation process.

23. The system of embodiment 1, additionally comprising a user-controlled installation process.

24. A method of installing one or more piles, comprising:
  driving anchors unto the seabed at intermediate sections rather than from the top of the pile
  wherein installation of the piles occurs subsea at deep ocean depth with subsea tooling. Other embodiments are used at shallow depths.

The method of embodiment 1, wherein the one or more helical piles are in a single configuration.

26. The method of embodiment 1, wherein the one or more helical piles are in a group configuration.

27. The method of embodiment 1, wherein the helical piles secure a floating offshore asset.

28. The method of embodiment 1, wherein the helical piles secure a fixed offshore asset.

29. The method of embodiment 1, wherein the installing uses standard offshore vessel spreads.

30. The method of embodiment 1, wherein the method includes a subsea hydraulic power unit.

31. The method of embodiment 1, wherein the method includes subsea communication bottles.

32. The method of embodiment 1, wherein the method includes offshore rated support structure/lifting points.

33. The method of embodiment 1, wherein the method includes self-leveling legs.

34. The method of embodiment 1, wherein the method includes anchor disconnection/alignment guides.

35. The method of embodiment 1, wherein the method includes modular drive train method.

36. The method of embodiment 25, wherein the modular drive train method
  torque heads driven by hydraulic or electric motors,
  hydraulic motors attached drive to acme rods or linear actuators providing downward force, and
  various monitoring sensors 37. The method of embodiment 1, wherein the intermediate sections are 5-20 feet in length.

38. The method of embodiment 1, wherein the total installation length is over 100 feet.

39. The method of embodiment 1, wherein the total installation length is over 5 feet.

40. The method of embodiment 1, wherein the method additionally comprises a group anchor which includes a skirt.

41. The method of embodiment 40, wherein the skirt is self-installing.

42. The method of embodiment 40, wherein the skirt is installed with additional force provide by the installation tool.

43. The method of embodiment 1, wherein the helical piles are rigid helical piles.

44. The method of embodiment 1, wherein the helical piles are flexible helical piles.

45. The method of embodiment 1, additionally comprising an automated installation process.

46. The method of embodiment 1, additionally comprising a user-controlled installation process.

What is claimed is:

1. An installation tool for installing a group anchor system, wherein the group anchor system comprises at least two flexible piles, the installation tool comprising:
  a plurality of installation modules, wherein each installation module comprises means for installing a pile from an intermediate point along one of the at least two flexible piles; and
  wherein the installation tool further comprises a plurality of removable installation tubes, each of which surrounds a flexible shaft of each flexible pile;
  wherein each installation tube is provided with a plurality of lugs along its length for mating with a drive head of a drive motor such that the installation tube, and thus the pile, is driven from a point along its length rather than, or in addition to, its end.

2. The installation tool of claim 1, wherein each installation module comprises:
  a linear guide rail;
  a driver platform engaging the linear guide rail for movement thereon; wherein the drive platform includes a drive motor for driving a drive head for engaging and driving a pile; and
  a motor for inserting or removing a pile.

3. The installation tool of claim 1, wherein each installation module comprise roller based drive system.

4. The installation tool of claim 1, wherein each of the at least two piles is associate with a single module of the plurality of installation modules or where more than one of the at least two piles is associated with a single installation module.

5. The installation tool of claim 1, wherein each installation module further comprises means for engaging and driving a pile from a point along its length, rather than from an end.

6. The installation tool of claim 1, wherein the installation tool is adapted for subsea use.

7. The installation tool of claim 1, wherein the at least two piles are helical piles, and the drive motor provides rotational force to drive a helical pile.

8. The installation tool of claim 1, wherein each installation tube comprises multiple sections, wherein adjacent sections are connected by a drive lug for mating with the drive head of the drive motor, such that the installation tool may be driven from any drive lug location, rather than from the end.

9. The installation tool of claim 1, wherein the tool is adapted for driving one or more piles that are rigid piles, wherein each rigid pile has a plurality of lugs along its length for mating with the drive head of the drive motor such that the pile is driven from a point along its length rather than, or in addition to, its end.

10. The installation tool of claim 1 wherein the plurality of installation modules comprises 2 to 100 modules arranged in a predetermined pattern with respect to each other and each corresponding to a location of a pile to be driven.

11. The installation tool of claim 1, comprising a control system permitting manual, semiautomatic, or automatic driving of each module independently or simultaneously.

12. The installation tool of claim 1, wherein each installation tube comprises multiple sections, wherein adjacent sections are connected by a drive lug for mating with the drive head of the drive motor, such that the installation tool may be driven from any drive lug location, rather than from the end.

13. The installation tool of claim 1, wherein the tool is adapted for driving one or more piles that are rigid piles, wherein each rigid pile has a plurality of lugs along its length for mating with the drive head of the drive motor such that the pile is driven from a point along its length rather than, or in addition to, its end.

14. The installation tool of claim 1 wherein the plurality of installation modules comprises 2 to 100 modules arranged in a predetermined pattern with respect to each other and each corresponding to a location of a pile to be driven.

15. The installation tool of claim 1, comprising a control system permitting manual, semiautomatic, or automatic driving of each module independently or simultaneously.

16. An installation tool for installing a group anchor system, wherein the group anchor system comprises at least two flexible piles, the installation tool comprising:
a plurality of installation modules, wherein each installation module comprises means for installing a pile from an intermediate point along one of the at least two flexible piles; and
wherein the installation tool further comprises a plurality of removable installation tubes, each of which surrounds a flexible shaft of each flexible pile;
wherein each installation tube comprises multiple sections, wherein adjacent sections are connected by a drive lug for mating with a drive head of a drive motor, such that the installation tool may be driven from any drive lug location, rather than from the end.

17. The installation tool of claim 16, wherein each installation module comprises:
a linear guide rail;
a driver platform engaging the linear guide rail for movement thereon; wherein the drive platform includes a drive motor for driving a drive head for engaging and driving a pile; and
a motor for inserting or removing a pile.

18. The installation tool of claim 16, wherein each installation module comprises roller based drive system.

19. The installation tool of claim 16, wherein each of the at least two piles is associate with a single module of the plurality of installation modules or where more than one of the at least two piles is associated with a single installation module.

20. The installation tool of claim 16, wherein each installation module further comprises means for engaging and driving a pile from a point along its length, rather than from an end.

21. The installation tool of claim 16, wherein the installation tool is adapted for subsea use.

22. The installation tool of claim 16, wherein the at least two piles are helical piles, and the drive motor provides rotational force to drive a helical pile.

* * * * *